United States Patent
Park et al.

(10) Patent No.: US 8,050,170 B2
(45) Date of Patent: Nov. 1, 2011

(54) NEAR FIELD OPTICAL HEAD AND INFORMATION RECORDING AND REPRODUCING DEVICE

(75) Inventors: Majung Park, Chiba (JP); Manabu Oumi, Chiba (JP); Masakazu Hirata, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 12/733,982

(22) PCT Filed: Oct. 3, 2008

(86) PCT No.: PCT/JP2008/068024
§ 371 (c)(1),
(2), (4) Date: Sep. 13, 2010

(87) PCT Pub. No.: WO2009/044842
PCT Pub. Date: Apr. 9, 2009

(65) Prior Publication Data
US 2011/0007621 A1    Jan. 13, 2011

(30) Foreign Application Priority Data
Oct. 4, 2007 (JP) .................................. 2007-260566

(51) Int. Cl.
*G11B 7/00* (2006.01)
(52) U.S. Cl. ........................ 369/112.23; 369/112.27
(58) Field of Classification Search .................. None
See application file for complete search history.

(56) References Cited

U.S. PATENT DOCUMENTS

| | | | |
|---|---|---|---|
| 6,795,380 B2* | 9/2004 | Akiyama et al. | 369/13.33 |
| 7,034,277 B2* | 4/2006 | Oumi et al. | 250/216 |
| 2002/0036871 A1* | 3/2002 | Yano et al. | 360/317 |
| 2004/0081031 A1* | 4/2004 | Saga et al. | 369/13.33 |
| 2005/0018547 A1* | 1/2005 | Akiyama et al. | 369/13.02 |

FOREIGN PATENT DOCUMENTS

| | | | |
|---|---|---|---|
| JP | 7-225912 | * | 8/1995 |
| JP | 2002-100006 | * | 4/2002 |
| JP | 2002-298302 | * | 10/2002 |
| JP | 2003-4622 | * | 1/2003 |
| JP | 2004-158067 | * | 6/2004 |
| WO | WO2007/074650 | * | 7/2007 |

\* cited by examiner

*Primary Examiner* — Paul Huber
(74) *Attorney, Agent, or Firm* — Adams & Wilks

(57) ABSTRACT

A near field optical head includes: a slider provided so as to float from a surface of the magnetic recording medium by a predetermined distance, the slider having a facing surface faced to a surface of the magnetic recording medium; a tipped-shaped near field light generating element formed on the facing surface to have a bottom surface in contact with the facing surface, a top surface formed into a flat surface by cutting a top end of a cone or a pyramid, the flat surface being at a predetermined angle with the bottom surface, and a side surface connecting the bottom surface with the top surface for generating near field light from the top surface; a magnetic pole part formed from a main magnetic pole formed on the side surface and an auxiliary magnetic pole facing the main magnetic pole; a thin film-shaped magnetic circuit connected to the magnetic pole part; and a coil wound around the magnetic circuit.

10 Claims, 13 Drawing Sheets

MOVING DIRECTION OF DISC D

MOVING DIRECTION OF DISC D

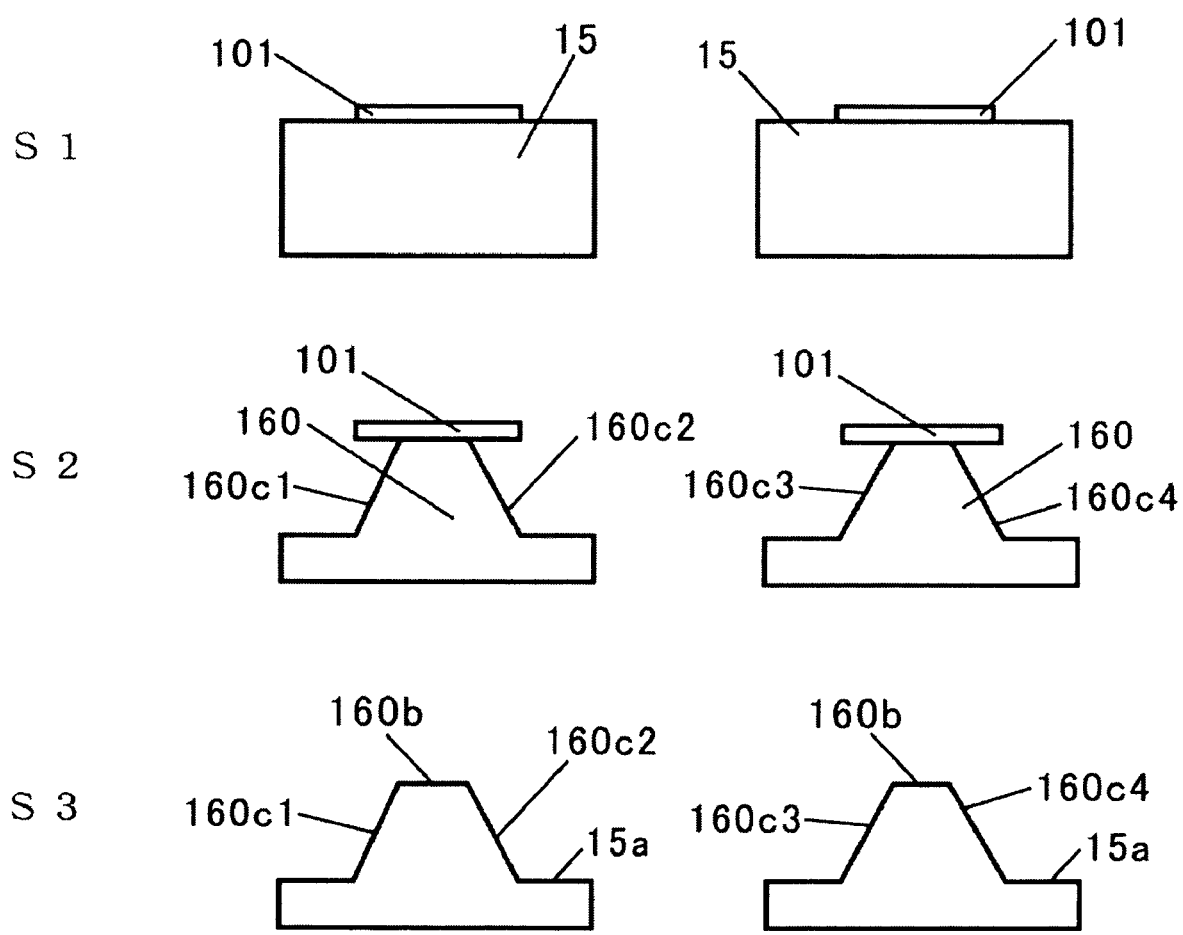

FIG. 6A    FIG. 6B
S 4 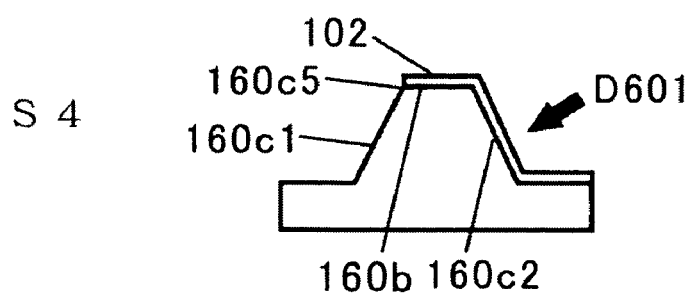 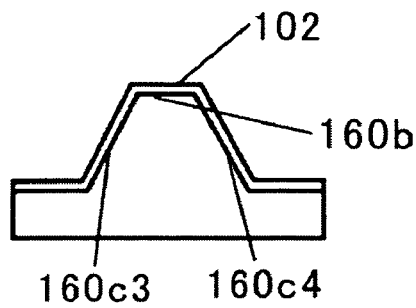
S 5 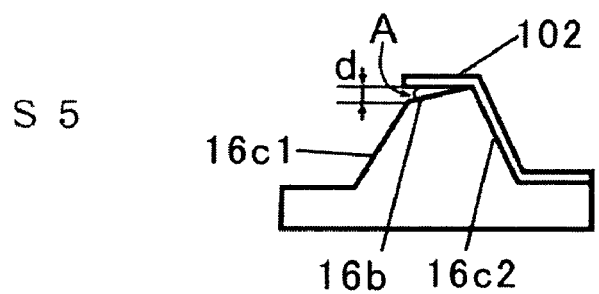 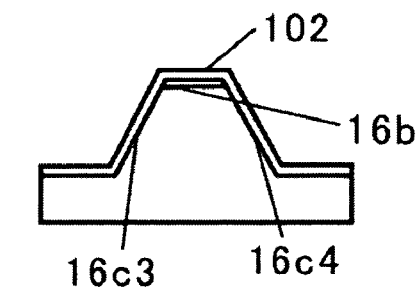
S 6 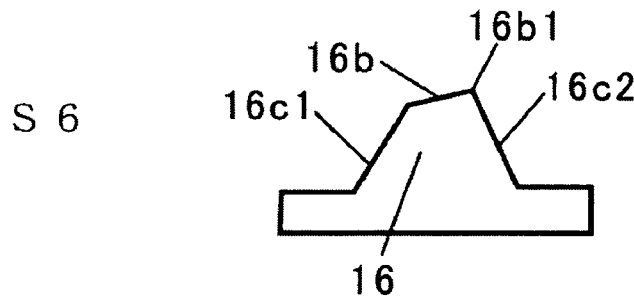 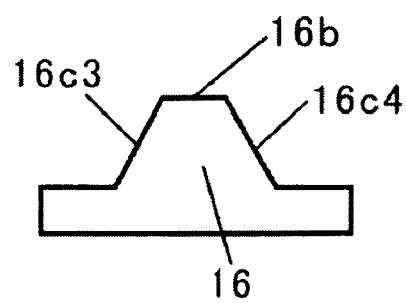
S 7 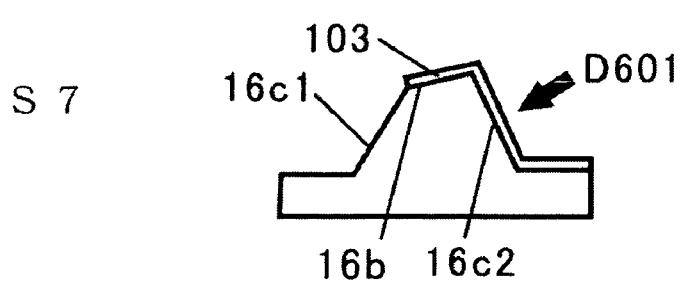 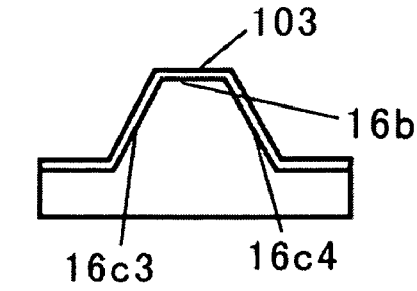
S 8 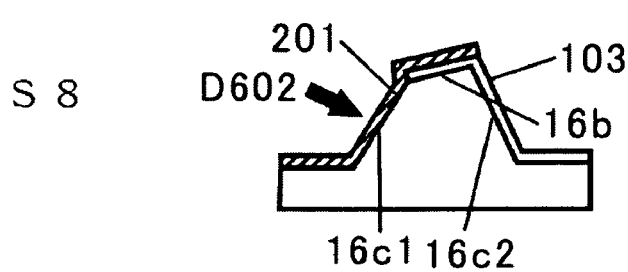 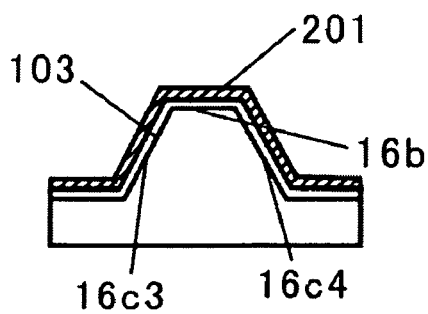

FIG. 7A         FIG. 7B
S 9
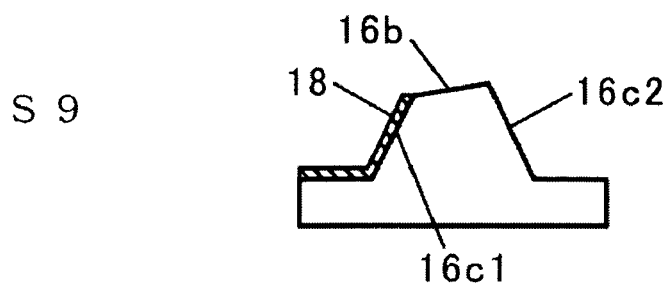 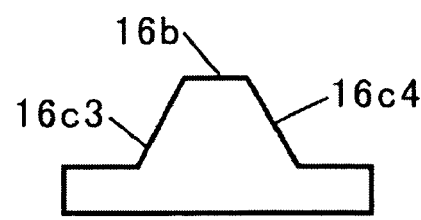
S 1 0
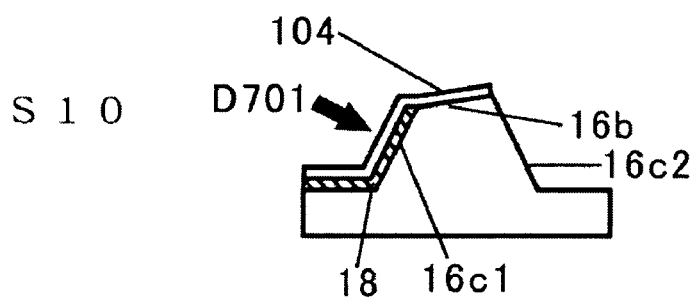 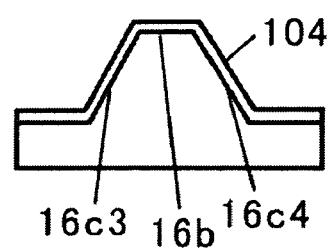
S 1 1
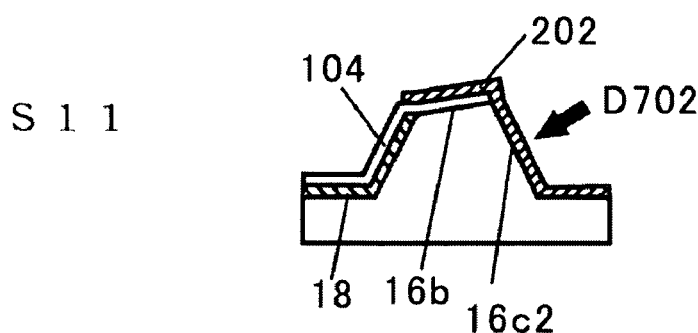 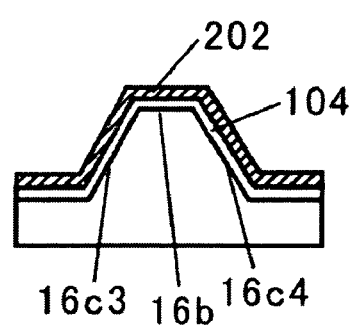
S 1 2
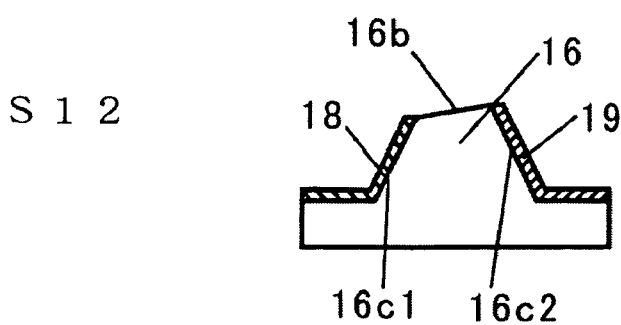 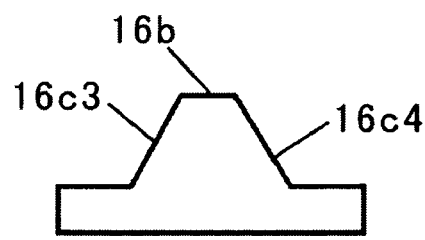

MOVING DIRECTION OF DISC

MOVING DIRECTION OF DISC D

FIG. 10
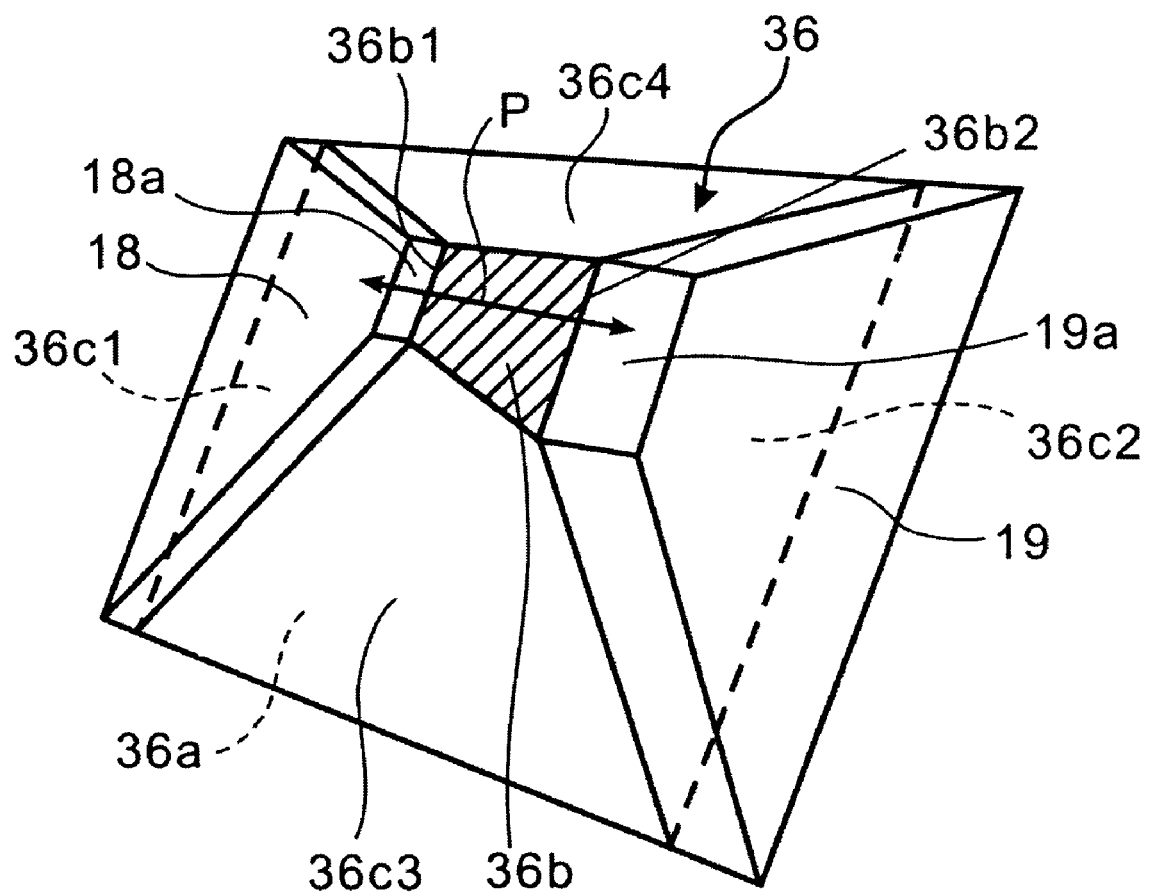
MOVING DIRECTION OF DISC D

MOVING DIRECTION OF DISC D

MOVING DIRECTION OF DISC D

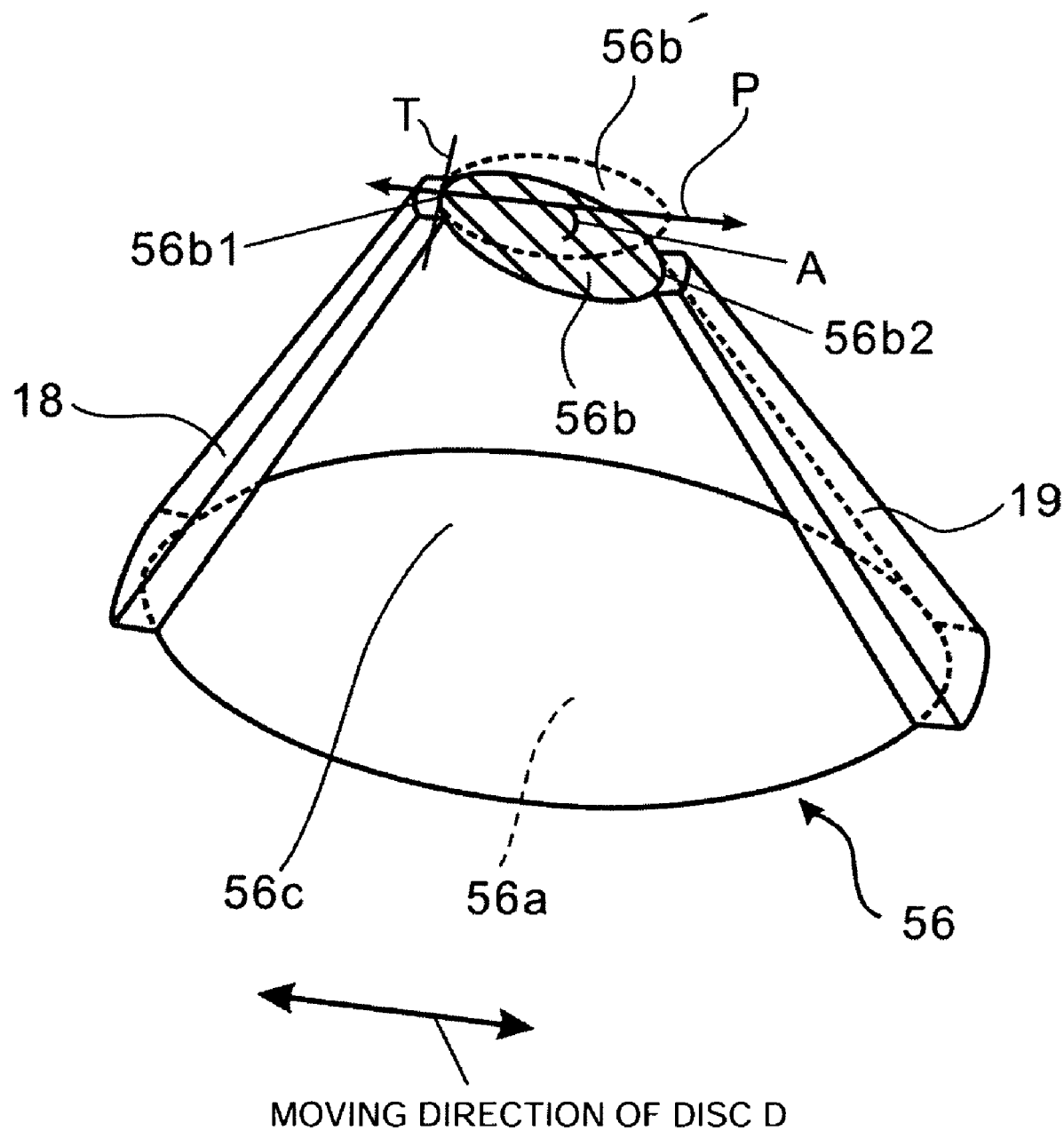

NEAR FIELD OPTICAL HEAD AND INFORMATION RECORDING AND REPRODUCING DEVICE

CROSS-REFERENCE TO RELATED APPLICATIONS

This application is a U.S. national stage application of International Application No. PCT/JP2008/068024 filed Oct. 3, 2008, claiming a priority date of Oct 4, 2007, and published in a non-English language.

TECHNICAL FIELD

The present invention relates to a near field optical head capable of using interaction of near field light to record various kinds of information in a recording medium with ultra-high density and an information recording and reproducing device including the near field optical head.

BACKGROUND ART

Light record applying near field light has recently attracted attention as a method for achieving an increase in density of an optical recording apparatus. In accordance with the above, studied has been mounting of a near field light generation element to an optical head in an optical recording apparatus.

Development of optical recording apparatuses with high density has aggressively progressed in accordance with a recent explosive increase in quantity of information such as an image and a moving picture. It has been known that an optical disc represented by a CD (a compact disc) and a DVD (a digital versatile disc) has a limited recording density due to a limit of diffraction of light. In order to exceed the limit, proposed have been a method of using light with shorter wavelength and a method of using near field light. The optical recording apparatus using near field light uses a method of making light incident on an optical minute aperture whose size is less than the wavelength, letting near field light, which is slightly spread from the aperture, and a surface of a recording medium operate mutually and detecting permeated or reflected scattering light to read out a minute data mark. A smallest mark size capable of record and reproduction is not defined by a wavelength of the incident light but by a size of the opening. Accordingly, making a minuter aperture allows the density of record to be improved. The aperture is necessary to be close to the surface of a recording medium in an optical recording apparatus using the near field light. Further, the aperture is required to scan the surface of the recording medium at high speed for the purpose of achieving high data transmission speed.

A flying head method, which is used for conventional magnetic record, has been typically proposed in order to meet the above requirements. As described in Patent Reference 1, for example, studied has been a near field light generation element having an optical minute aperture whose size is less than the wavelength of the incident light, the near field light generation element for generating near field light by radiating the incident light on the minute aperture. The minute aperture is formed so that a part of an outline of the aperture would be crossing at substantially right angles with a polarization direction of the incident light. This causes only a part of the outline of the minute aperture, the part crossing at substantially right angles with the polarization direction of the incident light to generate near field light having high intensity, so that high resolution and high optical efficiency can be achieved.

Moreover, as described in Patent Reference 2, on a surface, which is faced to the recording medium, of an optically transparent floating slider, provided closely to each other are a columnar or square pillar-shaped pad provided for controlling a condition of contact or floating between the slider and the recording medium and a probe for generating near field light having a minute spot size. Further, the pad and the probe are made substantially equal in height from a surface facing the information recording medium of the slider while the height from the surface of the probe, the surface facing the information recording medium, is made lower than the height from the surface of the pad, the surface facing the information recording medium. This causes a near field optical head and the slider to be formed into one body, and thereby, allows a near field optical head having a small-sized, lightweight and simple structure, the near field optical head having similar performance to that of the head used in a conventional magnetic disc apparatus, to be obtained. Furthermore, relative speed between a recording medium and an optical head for recording and reproducing information can be increased since the slider is small in size and light in weight. In addition, it is possible to generate the near field light having a minute size by forming an optically opaque thin film, a metal thin film, for example, on the pad and the probe in the near field optical head or by forming a minute aperture, which has a structure that a material forming the probe is exposed at a top end part of the probe and in which a surface of a part where the probe is exposed is in a plane substantially same as a surface of the metal thin film.

Further, in a magnetic recording apparatus, density in recording information in a single recording surface has increased recently in accordance with an increase in capacity of a hard disc and such in a computer apparatus. Surface record density should be increased in order to increase recording capacity per a magnetic disc, for example. A recording area per a bit in a recording medium, however, decreases according to an increase in record density. A decrease in size of a bit causes potential energy of a record of information of a bit to get closer to heat energy in a room temperature. Accordingly, occurs a problem of heat demagnetization such as reversal and disappearance of recorded information due to thermal fluctuation and the like.

An in-plane recording system, which has been generally used, is a system of recording magnetism so that a direction of magnetization would be faced to an in-plane direction of a recording medium. In this system, however, easily occurs the above-mentioned disappearance of recorded information and such due to heat demagnetization. Accordingly, the system is changing to a perpendicular recording system in which a signal of magnetization is recorded in a direction vertical to a recording medium for the purpose of solving such a disadvantage. The perpendicular recording system is a system in which magnetic information is recorded in a recording medium according to the principle that a single magnetic pole is brought close. The recording magnetic field is faced to a direction substantially vertical to a recording film in accordance with the perpendicular recording system. Information recorded in a vertical magnetic field is easy to keep stability in energy since it is difficult for the pole N and the pole S to form a loop in a surface of the recording film. Accordingly, the perpendicular recording system has a more tolerance to heat demagnetization than the in-plane recording system.

Recent recording media, however, are required to have further higher density according to the need for recording and reproducing a greater quantity of information having higher density. In order to meet the requirement, introducing has been a recording medium having a great coercivity for the purpose of keeping influence of adjacent magnetic sections and thermal fluctuation to a minimum. This makes record of information in a recording medium difficult even in the case of the above-mentioned perpendicular recording system.

In order to solve such a disadvantage, proposed has been a hybrid magnetic recording system (a near field light assisted magnetic recording system) in which near field light is used to locally heat a magnetic section and temporarily reduce the coercivity while writing is carried out. The hybrid magnetic recording system is a system of using the near field light generated by an interaction between a minute area and an optical aperture (Patent Reference 3, for example) formed in the near field optical head into a size smaller than the wavelength. Using the minute optical aperture overstepping a limit of diffraction of light, namely, the near field optical head including the near field light generation element, as described above, allows an area in an area lower than a wavelength of light, the wavelength being a limit in a conventional optical system, to be heated. Accordingly, the density of a recording bit can be made higher than that of a conventional optical information recording and reproducing device.

In the case of using a magnetic recording head having such a structure, the near field light is generated while the recording magnetic field is simultaneously applied so that various kinds of information would be recorded in the recording medium. That is to say, cooperation between the near field light and the magnetic field enables record in a recording medium to be achieved.

Patent Reference 1: JP-A-2002-092276
Patent Reference 2: JP-A-11-265520
Patent Reference 3: WO-2007/074650

DISCLOSURE OF THE INVENTION

Problems Solved by the Invention

The above-mentioned conventional optical recording head or magnetic recording head, however, still has the following problems. That is to say, in the optical apertures of the near field light generation elements described in the Patent References 1, 2 and 3, in the case that there are plural outlines where a polarizing (polarization) direction and an outline of the aperture cross at right angles with each other when the light introduced into the aperture is controlled by polarization, the near field light having equal intensity is generated for all of the plural outlines. In other words, making a heating spot of a medium further minuter, which is necessary for increasing the density, is limited since the recording medium is heated at plural near field light spots. This deteriorates resolution in a heating area of a medium.

Moreover, even in the case that a single near field light spot having intensity comparatively higher than that of the adjacent near field light spot can be generated among the plural near field light spots, resolution is deteriorated when a medium is heated at the single near field light spot since the adjacent near field light spot functioning as background light. This has caused impossibility in improving reliability in writing in some cases.

Means for Solving the Problems

In view of the above, an object of the invention is to provide a near field optical head and information recording and reproducing device, which are capable of miniaturization in size and generation of near field light with high resolution.

The invention is a near field optical head for generating near field light from an introduced light flux to heat a magnetic recording medium rotating in a fixed direction and for causing magnetization reversal by giving the magnetic recording medium a magnetic field to record information, the near field optical head characterized by comprising: a slider provided so as to float from a surface of the magnetic recording medium by a predetermined distance, the slider having a facing surface faced to a surface of the magnetic recording medium; a tipped-shaped near field light generating element formed on the facing surface to have a bottom surface in contact with the facing surface, a top surface formed into a flat surface by cutting a top end of a cone or a pyramid, the flat surface being at a predetermined angle with the bottom surface, and a side surface connecting the bottom surface with the top surface for generating near field light from each of a longest distance outline part of an outline of the top surface, the longest distance outline part having a longest distance between the facing surface and the outline of the top surface, and another outline part of the outline of the top surface, the another outline part being a part other than the longest distance outline part; a magnetic pole part formed on the side surface from a main magnetic pole and an auxiliary magnetic pole, the magnetic poles being faced to each other; a thin film-shaped magnetic circuit formed on the facing surface and connected to the magnetic pole part; and a coil wound around the magnetic circuit. Further, the invention is characterized in that the light flux includes polarized light substantially vertical to a straight line (an outline part 2) connecting plural points on an outline having a longest distance between an outline of the top surface and the facing surface, the points being in the outline of the top surface.

Moreover, the invention is characterized in that the light flux includes polarized light substantially vertical to a tangent at least at a point of the longest distance outline part.

Furthermore, the invention is characterized in that a metal film is provided on at least a part of the side surface of the tip.

In addition, the invention is characterized in that a metal film is provided on at least the side surface on a side in contact with the longest distance outline part.

Further, the invention is characterized in that a first metal film is formed on the side surface on the side in contact with the longest distance outline part while a second metal film is formed on the side surface on a side in contact with the another outline part.

Moreover, the invention is characterized in that materials of the first metal film and the second metal film are different.

Furthermore, the invention is characterized in that the main magnetic pole of the magnetic pole part is formed on the side surface on the side in contact with the longest distance outline part through the first metal film while the auxiliary magnetic pole of the magnetic pole part is formed on the side surface on the side in contact with the another outline part through the second metal film.

Additionally, the invention is characterized in that a part of the top surface including the longest distance outline part is parallel to the facing surface.

Further, the invention is characterized in that the facing surface has an element area provided with the near field light generating element and another area other than the element area, wherein the auxiliary magnetic pole is formed in the another area.

Moreover, the invention is characterized in that the auxiliary magnetic pole is formed on the side surface.

BRIEF DESCRIPTION OF THE DRAWINGS

[FIG. 5] They illustrate a method of manufacturing a core of the near field optical head shown in FIG. 4 in a sectional view.

[FIG. 6] They illustrate a method of manufacturing a core and a magnetic pole of the near field optical head shown in FIG. 4 in a sectional view.

[FIG. 7] They illustrate a method of manufacturing a core and a magnetic pole of the near field optical head shown in FIG. 4 in a sectional view.

[FIG. 10] It is an enlarged perspective view of a core of the near field optical head in accordance with the invention, shown from an end surface side and showing a third embodiment of the invention.

[FIG. 12] It is an enlarged perspective view of a core of a near field optical head in accordance with the invention from an inclined plane side, showing a fourth embodiment of the invention.

BEST MODE FOR CARRYING OUT THE INVENTION

First Embodiment

Now, described will be a near field optical recording element, a near field optical head and an information recording and reproducing device in accordance with a first embodiment of the invention, made reference to FIGS. 1 to 7. The information recording and reproducing device 1 in accordance with the embodiment is a device for writing to a disc (a magnetic recording medium) D including a magnetic recording layer d4 by a perpendicular recording system. In the embodiment, exemplified is an air floating type in which an air flow caused by rotation of the disc D is used to float a near field optical head 2.

Figure 1:
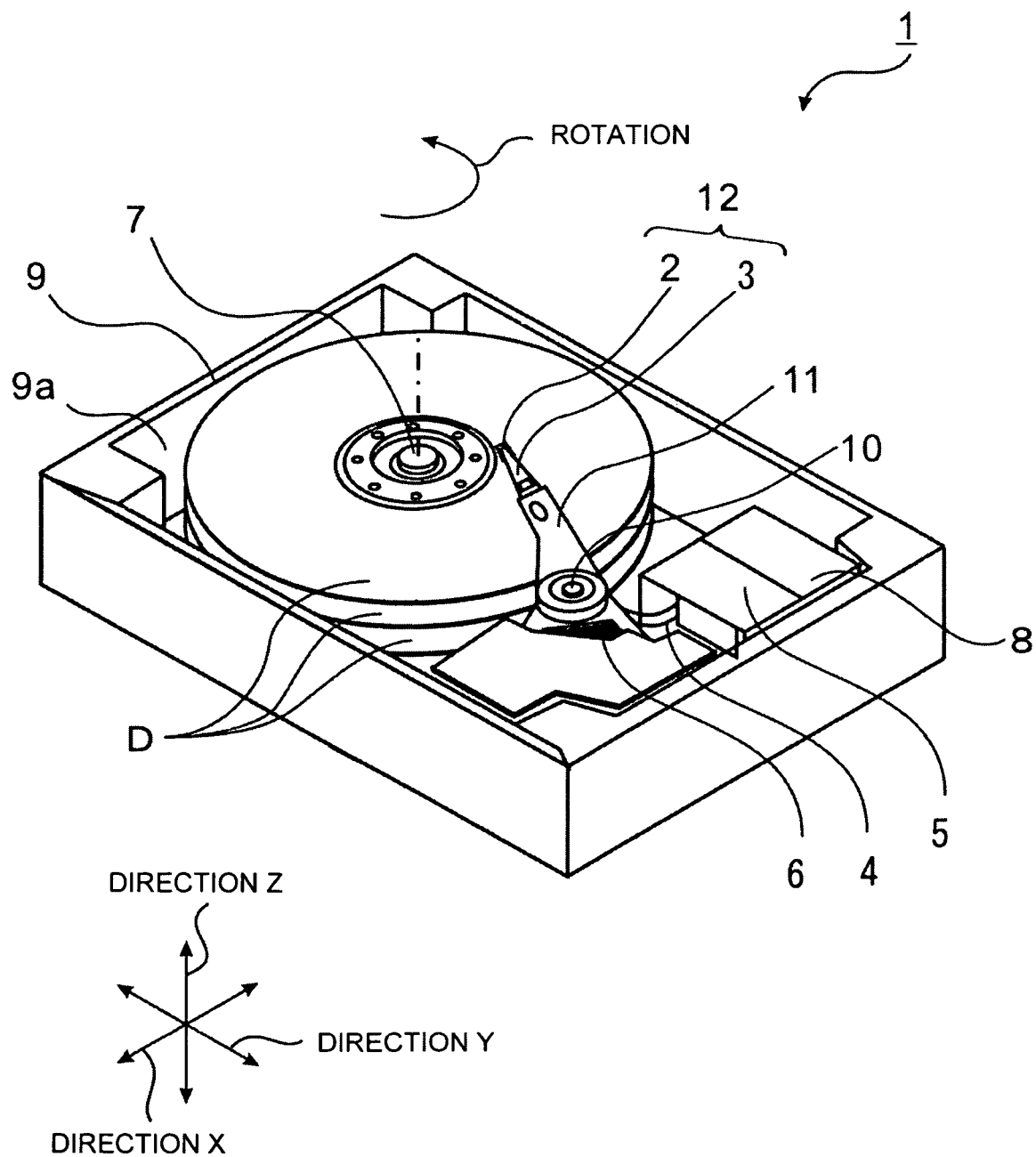
[FIG. 1] It illustrates a structure of an information recording and reproducing device having a near field optical head in accordance with the invention, showing a first embodiment of the invention.

FIG. 1 roughly shows an information recording and reproducing device 1 in accordance with the embodiment. The information recording and reproducing device 1 in accordance with the embodiment comprises a light near field optical head 2, a beam 3 capable of moving in a direction XY parallel to a surface of a disc D (a surface of a magnetic recording medium) for holding on a top end side the near field optical head 2 so as to be freely ratable about two axes (axes X and Y) parallel to the surface of the disc D, the two axes crossing at right angles with each other, a light signal controller (a light source) 5 for making a light flux L (shown in FIG. 2) incident on an optical waveguide 4 from a base end of the optical waveguide 4, an actuator 6 for holding a base end of the beam 3 and scan-moving the beam 3 toward the direction XY parallel to the surface of the disc D, a spindle motor (a rotation driving part) 7 for rotating the disc Din a fixed direction, a control part 8 for supplying a later-mentioned coil 21 with an electric current having been modulated in accordance with information and controlling an operation of the light signal controller 5 and a housing 9 for containing therein the respective components, as shown in FIG. 1.

The housing 9 is formed from a metal material such as aluminum into a quadrilateral shape in a top view. In the housing 9, formed is a concave part 9a for containing the respective components. Further, the housing 9 is provided with a lid not shown, which is detachably fixed, so that the lid would close an opening of the concave part 9a. The spindle motor 7 is mounted to a substantial center of the concave part 9a. Inserting the spindle motor 7 into a center hole allows the disc D to be detachably fixed. To a corner of the concave part 9a, mounted is the actuator 6. A carriage 11 is fixed to the actuator 6 through bearings 10. The beam 3 is mounted to a top end of the carriage 11. A drive of the actuator 6 allows the carriage 11 and the beam 3 to move together in the direction XY. The carriage 11 and the beam 3 are arranged to withdraw from a surface of the disc D through a drive of the actuator 6 when rotation of the disc D is stopped. The near field optical head 2 and the beam 3 form a suspension 12. The light signal controller 5 is mounted adjacently to the actuator 6 in the concave part 9a. The control part 8 is mounted adjacently to the actuator 6.

Figure 2A:
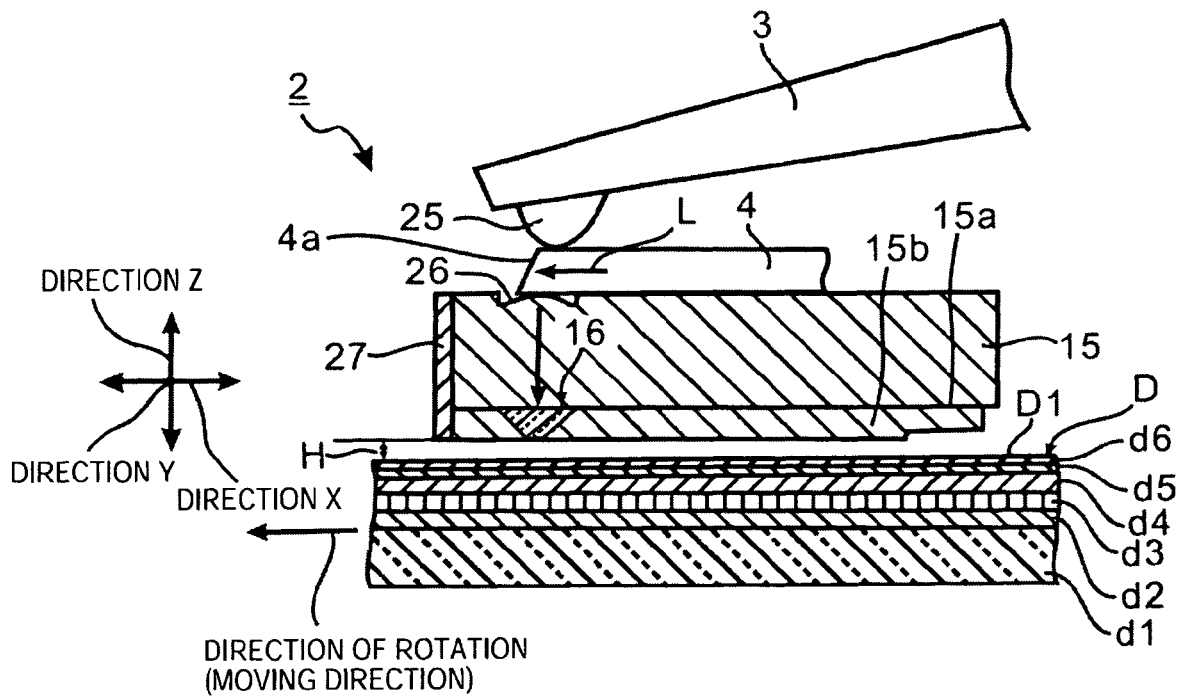
[FIG. 2] They are an enlarged sectional view of the near field optical head shown in FIG. 1 and an enlarged sectional view of a core and its periphery.
Figure 2B:
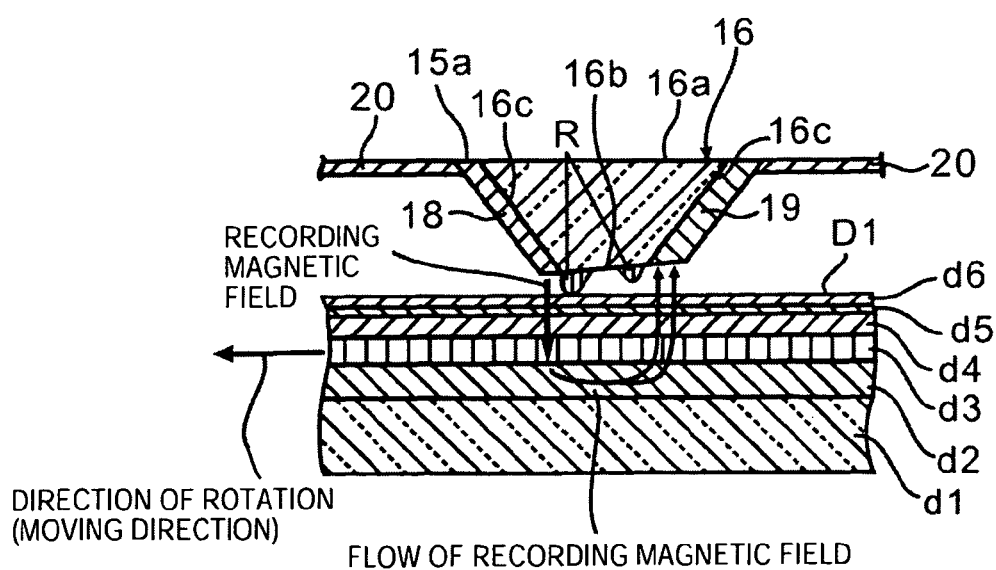

FIG. 2(a) is a sectional view of the near field optical head 2 and the disc D. FIG. 2(b) is an enlarged view of a core 16 in FIG. 2(a) and the periphery in accordance with the first embodiment. Now, described will be a detailed structure of the near field optical head 2.

The near field optical head 2 generates near field light R from an introduced light flux L to heat the disc D while applies a magnetic field to the disc D to cause magnetization reversal, and thereby, to record information. That is to say, the near field optical head 2 is provided so as to float from the disc surface D1 by a predetermined distance H. The near field optical head 2 comprises a slider 15 including a facing surface 15a faced to the disc surface D1, a core 16 fixed to the slider 15 for generating the near field light R, an optical waveguide 4 and lens 26 for introducing the light flux L into the core 16, a main magnetic pole 18 formed in the core 16 and an auxiliary magnetic pole 19.

The slider 15 is formed from a light transmissible material such as quartz glass into the shape of a substantially rectangular parallelepiped. The slider 15 is held so as to hang from a top end of the beam 3 through a gimbal part 25 with the facing surface 15a faced to a disc D side. The gimbal part 25 is a component whose movement is controlled so as to be displaced only in a direction Z vertical to the disc surface D1 and about an axis X and an axis Y. This allows the slider 15 to freely rotate about the two axes (the axes X and Y) parallel to the disc surface D1, the two axes crossing at right angles with each other, as described above.

On the facing surface 15a of the slider 15, formed is a convex part 15b for generating pressure for floating by using viscosity of an air flow caused by the rotating disc D. In the embodiment, exemplified is a case in which two convex parts 15b extending along a longitudinal direction so as to form a line into the shape of a rail is formed. The embodiment, however, is not limited to the case. Any concave and convex shape is possible so long as a positive pressure for separating the slider 15 from the disc surface D1 and negative pressure for attracting the slider 15 to the disc surface D1 are designed to be adjusted so that the slider 15 would be floated under an optimal condition. A surface of the convex part 15b is referred to as an ABS (air bearing surface).

The slider 15 receives force for floating from the disc surface D1 through the two convex parts 15b. The slider 15 further receives force pushing the slider 15 toward the disc surface D1 by means of the beam 3. Due to the balance of force between both of the above, the slider 15 is arranged to float under a condition that the slider 15 is separated from the disc surface D1 by the predetermined distance H, as described above.

Further, an end surface 16b of the core 16 is formed into a size with which the near field light R is generated when the light flux L is introduced inside. That is to say, a size of an aperture of the end surface 16b of the core 16 is designed so as to be a size greatly minuter than that of a wavelength of the light flux L (a size in which a side is several tens nm, for example), so that usual transmission light does not pass therethrough. The aperture size, however, enables the near field light R to leak in the vicinity of the aperture.

In an upper surface of the slider 15, formed at a position just above the core 16 is a lens 26. The lens 26 is an aspheric micro lens formed by etching with a gray scale mask, for example. Moreover, the optical waveguide 4 such as an optical fiber is mounted to the upper surface of the slider 15. The optical waveguide 4 has a top end, which is cut by substantially 45 degrees to form a mirror surface 4a. A mounting position is adjusted so that the mirror surface 4a would be located just above the lens 26. The optical waveguide 4 is led and connected to the light signal controller 5 through the beam 3, the carriage 11 and such.

This allows the optical waveguide 4 to guide the light flux L incident from the light signal controller 5 to the top end, to reflect the light flux L on the mirror surface 4a to change a direction of the light flux L and to emit the light flux L to the lens 26. The emitted light flux L is arranged to pass through the slider 15 after converged by means of the lens 26, and then, to be introduced into a bottom surface 16a of the core 16.

Figure 3:
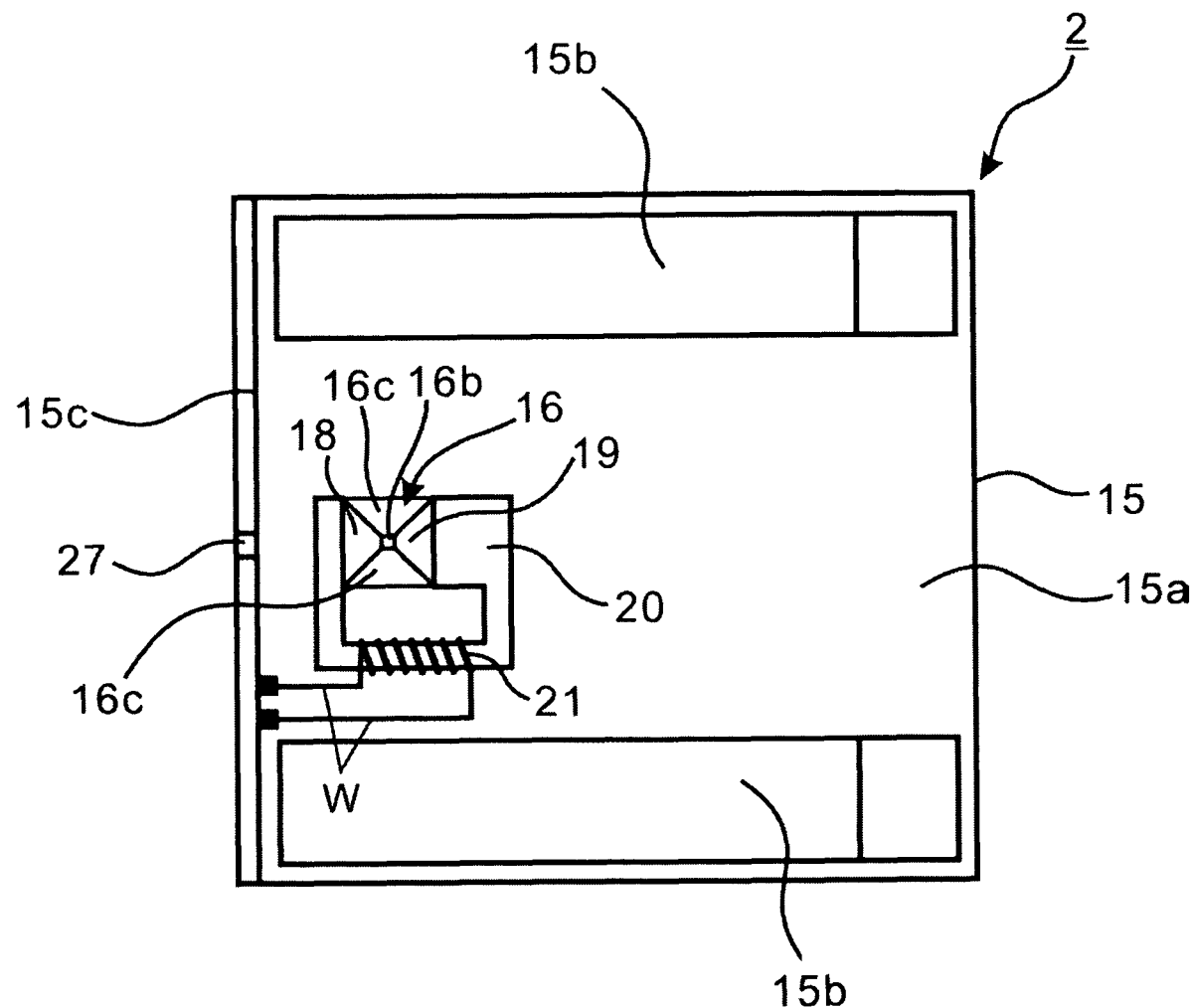
[FIG. 3] It illustrates the near field optical head shown in FIG. 2 in a view from a disc surface side.

In a top end surface 15c of the slider 15, formed is a magnetoresistive effect film 27 in which electric resistance is changed in accordance with a size of the magnetic field leaked from the magnetic recording layer d4 of the disc D, as shown in FIGS. 2 and 3. The magnetoresistive effect film 27 is formed so that its width would be substantially same as that of the end surface 16b of the core 16. The magnetoresistive effect film 27 is supplied with a bias current from the control part 8 through a lead film and such, which are not shown. This allows the control part 8 to detect a change in magnetic field leaked from the disc D as a change in voltage, so that a signal is reproduced in accordance with the change in voltage. That is to say, the magnetoresistive effect film 27 functions as a reproducing element.

The disc D in the embodiment uses a vertical double layer film disc comprising at least two layers of the perpendicular recording layer d4 having a magnetization easy axis in a direction vertical to the disc surface D1 and a soft magnetic underlayer d2 formed from a material having high magnetic permeability. As such a disc D, used is a disc in which the soft magnetic underlayer d2, a middle layer d3, the perpendicular recording layer d4, a protection layer d5 and a lubricating layer d6 are formed on a substrate d1 in order, as shown in FIG. 2, for example.

As the substrate d1, used is an aluminum substrate, a glass substrate and the like, for example. The soft magnetic underlayer d2 is a layer having a high magnetic permeability. The middle layer d3 is a crystal control layer of the perpendicular recording layer d4. The perpendicular recording layer d4 is a vertical anisotropic magnetism layer. A CoCrPt alloy, for example, is used for the perpendicular recording layer d4. The protection layer d5 is for protecting the perpendicular recording layer d4. A DLC (diamond like carbon) film, for example, is used for the protection layer d5. For the lubricating layer d6, used is a fluorine liquid lubricating material, for example.

FIG. 3 illustrates a structure of the near field optical head 2 on the facing surface 15a. The convex parts 15b are provided on the both ends of the facing surface 15a. The core 16 is formed at a substantially center position between the convex parts 15b. The core 16 may be formed at any position along the center position on the facing surface 15a, but is preferably formed at a position close to the magnetoresistive effect film 27 as much as possible. The main magnetic pole 18 and the auxiliary magnetic pole (return pole) 19 are provided on inclined surfaces of the core 16 so as to face each other via the aperture. This allows an area irradiated with the near field light on the disc D and an area irradiated with the recording magnetic field from the magnetic pole on the disc D to be accorded much more. Accordingly, the near field light and the magnetic field can be prevented from spreading, and thus, reliability in writing can be improved.

A coil 20 wound around a magnetic circuit 20 on the facing surface 15a is connected to a wiring W supplied with an electric current modulated in accordance with information from the control part 8. An electric flow to the coil 20 causes a magnetic field in the magnetic circuit 20. The principle of generation of the recording magnetic field is that the recording magnetic field flows from the main magnetic pole 18 to the auxiliary magnetic pole 19.

Figure 4A:
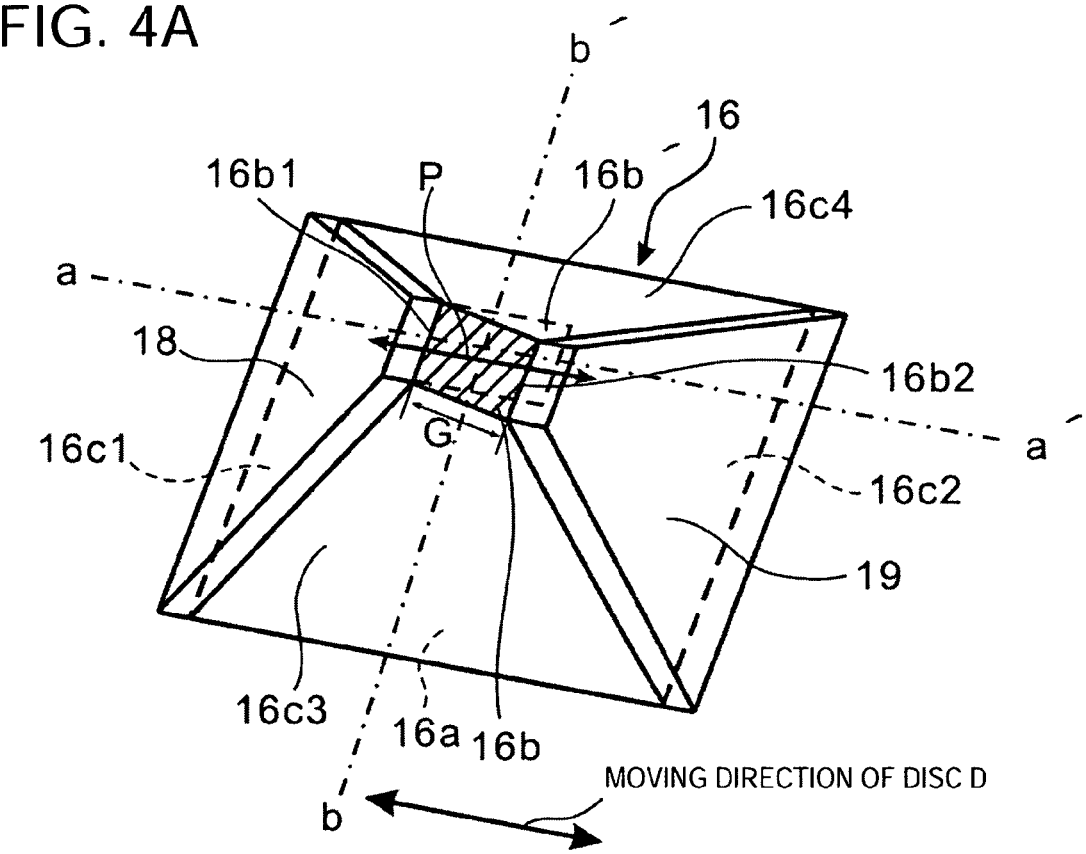
[FIG. 4] They are an enlarged perspective view and an enlarged sectional view of a core of the near field optical head shown in FIG. 3, shown from an inclined plane side.
Figure 4B:
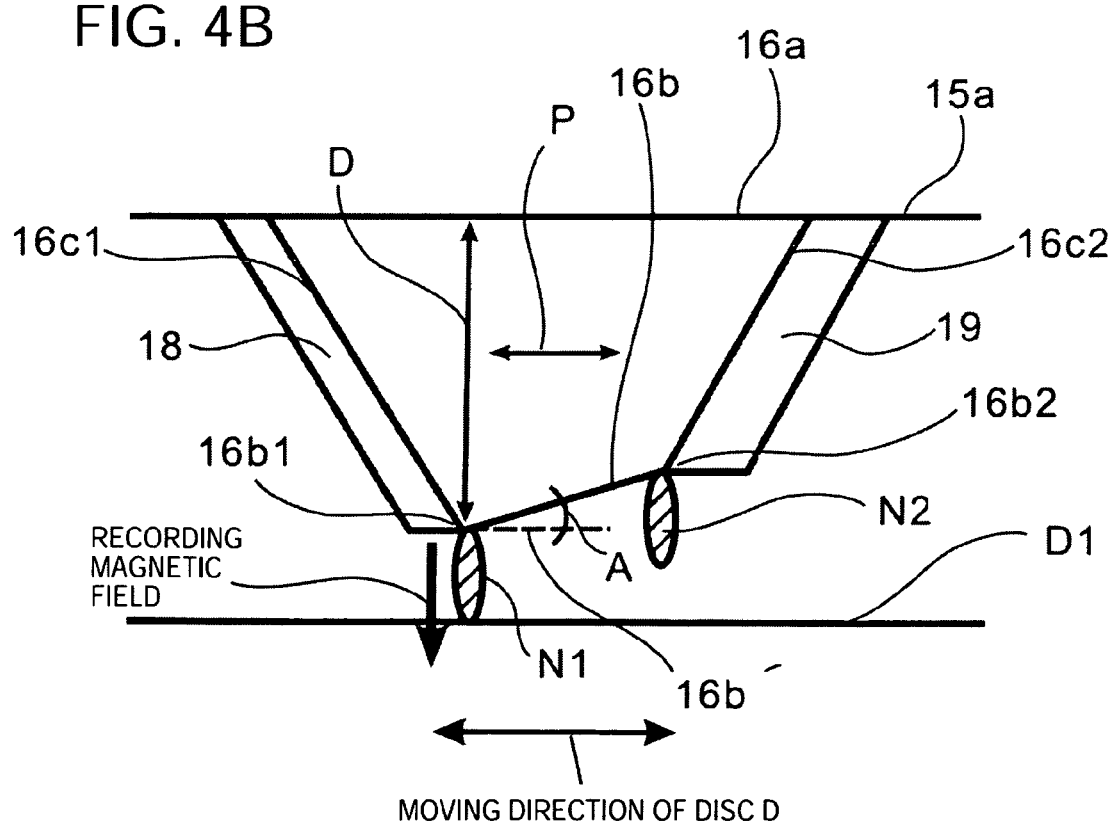

FIG. 4 is enlarged views of the core 16. FIG. 4(a) illustrates an example in the case that a top surface 16b of the core 16 is in a quadrilateral shape. FIG. 4(b) is a sectional view taken along a-a' in FIG. 4(a).

The core 16 is formed from the bottom surface 16a, the end surface 16b and four side surfaces 16c1, 16c2, 16c3 and 16c4, as shown in FIG. 4(a). Concretely, the core 16 is processed so as to include the bottom surface 16a, which is formed into a rectangular shape in a plan view so as to have four sides, the end surface 16b, which is formed smaller in area than the bottom surface 16a into the shape substantially same as that of the bottom surface 16a (a rectangular shape in a plan view) and which is provided in a position away from the bottom surface 16a by a predetermined distance, and four side surfaces 16c, which are formed by respectively connecting the tops of the bottom surface 16a and the end surface 16b. In the embodiment, the end surface 16b is inclined at a predetermined angle A with a surface 16b' parallel to the bottom surface 16a. As a result, the end surface 16b has four outlines in which an outline (a longest distance outline part) 16b1 has a longest distance from the bottom surface 16a and an outline (another outline part) 16b2 has a shortest distance.

The core 16, however, is not limited to have the four side surfaces 16c. The core may have a bottom surface and an end surface, which are in the shape of a polygon in a plan view (hexagon, octagon, trapezoid, for example), and plural side surfaces formed by connecting the respective tops of the bottom surface and the end surface (six surfaces in the case that the bottom surface and the end surface are in the shape of a hexagon, for example). The core may be in any shape so long as it has a structure that the end surface is inclined at a predetermined angle with the bottom surface. The bottom surface and the end surface may be formed differently in shape.

Furthermore, the main magnetic pole 18 and the auxiliary magnetic pole 19, which are formed from a magnetic material, are formed in the side surface 16c1 and the side surface 16c2. The main magnetic pole 18 and the auxiliary magnetic pole 19 are connected respectively to the both ends of the magnetic circuit 20 formed from the material same as that of the magnetic poles by patterning in the slider 15, as shown in FIG. 3.

The core 16 having such a structure is fixed so that the bottom surface 16a would be in surface-contact with the facing surface 15a of the slider 15, as shown in FIG. 2. In this case, the two side surfaces 16c1 and 16c2, which are faced to each other and which have the main magnetic pole 18 and the auxiliary magnetic pole 19, are fixed so as to be in line in a longitudinal direction of the slider 15, namely, along a moving direction of the disc D. It may be possible to fix the core 16 and the slider 15 to each other after forming them separately or to form them into one body from quartz and the like. Particularly, forming the core 16 and the slider 15 into one body is more preferable since it allows a manufacturing process to be simplified and time for manufacture to be shortened.

The end surface 16b of the core 16 is inclined at a predetermined angle with the facing surface 15a of the slider 15 and the disc surface D1 since the bottom surface 16a is made surface-contact with the facing surface 15a. In this case, the height of the core 16 is set so that the outline 16b1 of the end surface 16b would be substantially same in height as the convex part 15b.

The end surface 16b of the core 16 is formed into a size smaller than the bottom surface 16a and into the shape substantially same as that of the bottom surface 16a, as described above. Accordingly, the four side surfaces 16c1, 16c2, 16c3 and 16c4 are inclined so that the distance between the respective facing side surfaces is gradually shortened as the side surfaces 16c1, 16c2, 16c3 and 16c4 come close to the end surface 16b. Especially, the size of the end surface 16b of the core 16 is an extremely minute size for generating the near field light R. Accordingly, an interval (a magnetic gap) G between the both magnetic poles 18 and 19 in the end surface 16b is very short. In other words, the magnetic gap G is extremely minute.

FIG. 4(b) illustrates the principle that the near field light generated in the end surface 16b locally heats the disc surface D1. Localized near field lights N1 and N2 are generated in the vicinity of the outline 16b1 and the outline 16b2 of the end surface 16b when the light flux L having a polarization direction P substantially vertically to the outline 16b1 and the outline 16b2 is introduced into the core 16. In this case, the end surface 16b is inclined at the predetermined angle A with the disc surface D1. This causes only the near field light N1 generated in the vicinity of the outline 16b1 closest to the disc surface D1 to heat the disc surface D1. As a result, an operation of the near field light N2 on the disc surface D1 can be suppressed, differently from a case of a conventional structure in which the end surface 16b is parallel to the disc surface D1 and distance between the near field light N1 and the disc surface D1 is substantially same as distance between the near field light N2 and the disc surface D1.

In the conventional structure, the near field light having equal intensity is generated in plural areas to heat a recording medium (the disc surface D1) at plural near field light spots in the case that the light to be introduced into the aperture is controlled by polarization. Accordingly, forming a heating spot of the medium (the disc surface D1) minuter for the purpose of increasing density is limited, so that resolution in a heating area of the medium (the disc surface D1) is inferior. In the structure of the core 16 in FIG. 4, however, a problem caused by the conventional structure can be prevented from occurring and only the near field light N1 having high resolution can be generated.

In addition to the structure of the core 16, introduced is the light flux L including polarized light substantially vertical to a tangent at least a point of the outline where distance D from the bottom surface is longest. This allows an effect of the structure of the core 16 to be achieved by any core structure in which the near field light is generated in two places in the outline of the end surface and the end surface is inclined at a predetermined angle with the bottom surface.

In accordance with the above, heated can be only a minute area of the disc surface D1 on which the recording magnetic field generated from the main magnetic pole 18 operates. Therefore, thermal assistance can be performed with high resolution and high precision in recording the magnetic field.

The main magnetic pole 18 and the auxiliary magnetic pole 19 are provided adjacently to each other in order to make an area small, the area where the area (near field light area) irradiated with the near field light on the disc D1 is accorded with the area (the magnetic pole area) irradiated with the recording magnetic field from the magnetic pole on the disc D1. Especially in the embodiment, the main magnetic pole 18 and the auxiliary magnetic pole 19 are provided so as to face each other through the aperture on the inclined surfaces of the core 16 for the purpose of minimizing the area where the near field light area is accorded with the magnetic pole area. Under such a condition, the outline 16b1 adjacent to the main magnetic pole 18 and the outline 16b2 adjacent to the auxiliary magnetic pole 19 are faced to each other. Accordingly, the direction of polarization of the light flux L is made substantially vertical to the both outlines. This causes a case of generating the near field light respectively from both of the outlines.

As described above, generation of the near field light from two places causes an area of the near field light in the disc D1 to be larger than that of a case of the near field light from one place, so that the near field light cannot be improved in resolution as a whole. Further, the area where the near field light area is accorded with the magnetic pole area is increased, so that it is impossible to record information with high density. In view of the above, an object of the invention is to prevent the near field light area of the disc surface D1 from being increased, and thereby, record information with high density even though the near field light is generated from two places. That is to say, in the invention, any one of the two outlines (16b1 and 16b2) for generating the near field light is provided at a position where a distance from the facing surface 15a of the slider 15 is longest. This allows the near field light from one outline to be radiated on the disc surface D1 more easily than the near field light from the other outline, so that the near field light from the other outline is difficult to be radiated on the disc surface D1. Accordingly, information can be recorded with high density without increasing the near field light area in the disc surface D1.

FIG. 5 illustrates an example of a method of manufacturing the core 16 in accordance with the first embodiment of the invention. FIG. 5(a) is a sectional view taken along a-a' in FIG. 4(a). FIG. 5(b) is a sectional view taken along b-b' in FIGS. 4(a). S1 to S3 denote steps of manufacture.

As shown in Step S1, an etching mask 101 is first formed on a surface of the slider 15, the surface being faced to the disc D.

The etching mask 101 is a photoresist thin film processed by photolithography. The etching mask 101 is in the shape of a rectangle.

As shown in Step S2, performed then is etching on the surface of the slider 15, which is faced to the disc D. The etching may be any of wet etching and dry etching, but should be isotropic etching. Wet etching using a solution of hydrogen fluoride acid may be used, for example, in the case that the slider 15 is made of quartz. Etching on surface of the slider 15, which is faced to the disc D, causes a truncated pyramid 160 having four side surfaces (160c1, 160c2, 160c3 an 160c4) to be formed under the etching mask 101.

The etching mask 101 is then removed, as shown in Step S3. For elimination of the etching mask 101, used is an organic solvent, fuming nitric acid and such. Elimination of the etching mask 101 causes a top surface 160b of the truncated pyramid 160 to be exposed.

Now, described will be examples of a method of forming the main magnetic pole 18 and the auxiliary magnetic pole 19 in the inclined surfaces 16c1 and 16c2 of the core 16 and a method of processing the end surface 16b inclined at a predetermined angle with the facing surface 15a, made reference to FIGS. 6 and 7.

FIG. 6 illustrates a method of processing the end surface 16b of the core 16. FIG. 6(a) is a sectional view taken along a-a' in FIG. 4(a). FIG. 6(b) is a sectional view taken along b-b' in FIG. 4(a).

First, an etching mask 102 is formed on the side surface 160c2 of the truncated pyramid 160 by a resin film forming method having directivity such as a spray coating method from a direction D601 substantially vertical to the side surface 160c2, as shown in Step S4. In the Step S4, the etching mask 102 is formed not only on the side surface 160c2 but also on the side surfaces 160c3 and 160c4 and the top surface 160b, which are adjacent to the side surface 160c2. The etching mask 102 is not formed on the side surface 160c1 facing the side surface 160c2 since the side surface 160c1 is behind the side surface 160c2 due to the directivity of the film forming method. The etching mask 102 is formed from a resin film such as a photo resist. The film thickness of the etching mask 102 is form several tens nm to several μm.

Following to the above, performed is processing so that the end surface 16b of the core 16 would be formed into the shape of an inclined surface having a predetermined angle A with the top end 160b, as shown in Step S5. Wet etching using a hydrogen fluoride acid solution causes side etching from a part (160c5 in Step S4) where the side surface 16c1 is in contact with a sacrifice layer 102 to progress, and thereby, to process the end surface 16b in the case that the truncated pyramid 160 is made of quartz. Changing the concentration of the hydrogen fluoride acid solution in the wet etching allows the predetermined angle A to be controlled. This method is suitable for mass production since plural cores 16 on the wafer can be collectively processed.

Further, it is also possible to use an FIB (focused ion beam) to form the end surface 16b in the shape of an inclined surface. Moreover, the inclined surface-shaped end surface 16b can be formed in a method of using a polishing material having a predetermined angle to obliquely polish the top surface 160b of the truncated pyramid 160.

The angle A should be controlled so that a distance d between the top surface 160b of the truncated pyramid 160 and the outline 16b2 of the end surface 16b of the core 16 would be from several nanometers to several tens nanometers.

In Step S6, the etching mask 102 having undergone the process of Step S5 is then removed by means of an organic solvent such as acetone. The sacrifice layer 102 can be more easily peeled off when ultrasonic waves are added in the above process. This allows the core 16 to have the structure of the end surface 16b and the four inclined surfaces (16c1, 16c2, 16c3 and 16c4).

A sacrifice layer 103 is then formed in a method similar to the method of forming the etching mask 102 in Step S4, as shown in Step S7. The sacrifice layer 103 is formed not only on the side surface 16c2 but also on the side surfaces 16c3 and 16c4 and the top surface 16b, which are adjacent to the side surface 16c2. The side surface 16c1 facing the side surface 16c2 is behind the side surface 16c2 due to the directivity of the film forming method. Accordingly, the sacrifice layer 103 is not formed on the side surface 16c1 facing the side surface 16c2. The sacrifice layer 103 is formed from a resin film such as a photo resist. The film thickness of the sacrifice layer 103 is form several tens nm to several μm.

Following to the above, formed is a magnetic film 201 by means of a metal film forming method having directivity such as a vacuum evaporation method, as shown in Step S8. The magnetic film 201 is formed not only on the sacrifice layer 103 formed on the side surface 160c1 and the top surface 16b but also on the sacrifice layer 103 formed on the side surfaces 16c3 and 16c4.

FIG. 7 illustrates a method of forming the main magnetic pole 18 and the auxiliary magnetic pole 19 on the inclined surfaces 16c1 and 16c2. FIG. 7(a) is a sectional view taken along a-a' in FIG. 4(a). FIG. 7(b) is a sectional view taken along b-b' in FIG. 4(a).

The sacrifice layer 103 is first lifted off by means of an organic solvent such as acetone, as shown in Step S9. Adding ultrasonic waves in the above process allows the sacrifice layer 102 to be more easily peeled off. The magnetic film 201 formed on the sacrifice layer 103 is also peeled off in Step S9, so that only the magnetic film 201 formed on the side surface 16c1 (the main magnetic pole 18) is left.

A sacrifice layer 104 is then formed on the side surface 16c1 on which the main magnetic pole 18 is formed by a photo resist forming method having directivity such as a spray coating method from a direction D701 substantially vertical to the side surface 16c1, as shown in Step S10. In the Step S10, the sacrifice layer 104 is formed not only on the main magnetic pole 18 formed on the side surface 16c1 but also on the side surfaces 16c3 and 16c4 and the end surface 16b, which are adjacent to the side surface 16c1. The sacrifice layer 104 is not formed on the side surface 16c2 facing the side surface 16c1 since the side surface 16c2 is behind the side surface 16c1 due to the directivity of the film forming method. The sacrifice layer 104 is formed from a photo resist into the film thickness of several tens nm to several μm.

A magnetic film 202 is then formed on the side surface 16c2 by means of a metal film forming method having directivity such as a vacuum evaporation method from a direction D702 substantially vertical to the side surface 16c2, as shown in Step S11. In Step S11, the magnetic film 202 is formed not only on the sacrifice layer 104 formed on the side surface 16c2 and the top surface 16b but also on the sacrifice layer 104 formed on the side surface 16c3 and 16c4.

Following to the above, the sacrifice layer 104 is peeled off by means of an organic solvent such as acetone, as shown in Step S12. Adding ultrasonic waves in the above process allows the sacrifice layer 104 to be more easily peeled off. The magnetic film 202 formed on the sacrifice layer 104 is also peeled off in Step S12, so that only the magnetic film 202 formed on the side surface 16c2 (the auxiliary magnetic pole 19) is left.

This allows the main magnetic pole 18 and the auxiliary magnetic pole 19 to be formed on the both side surfaces 16c1 and 16c2 of the core 16 with high precision.

Second Embodiment

Figure 8:
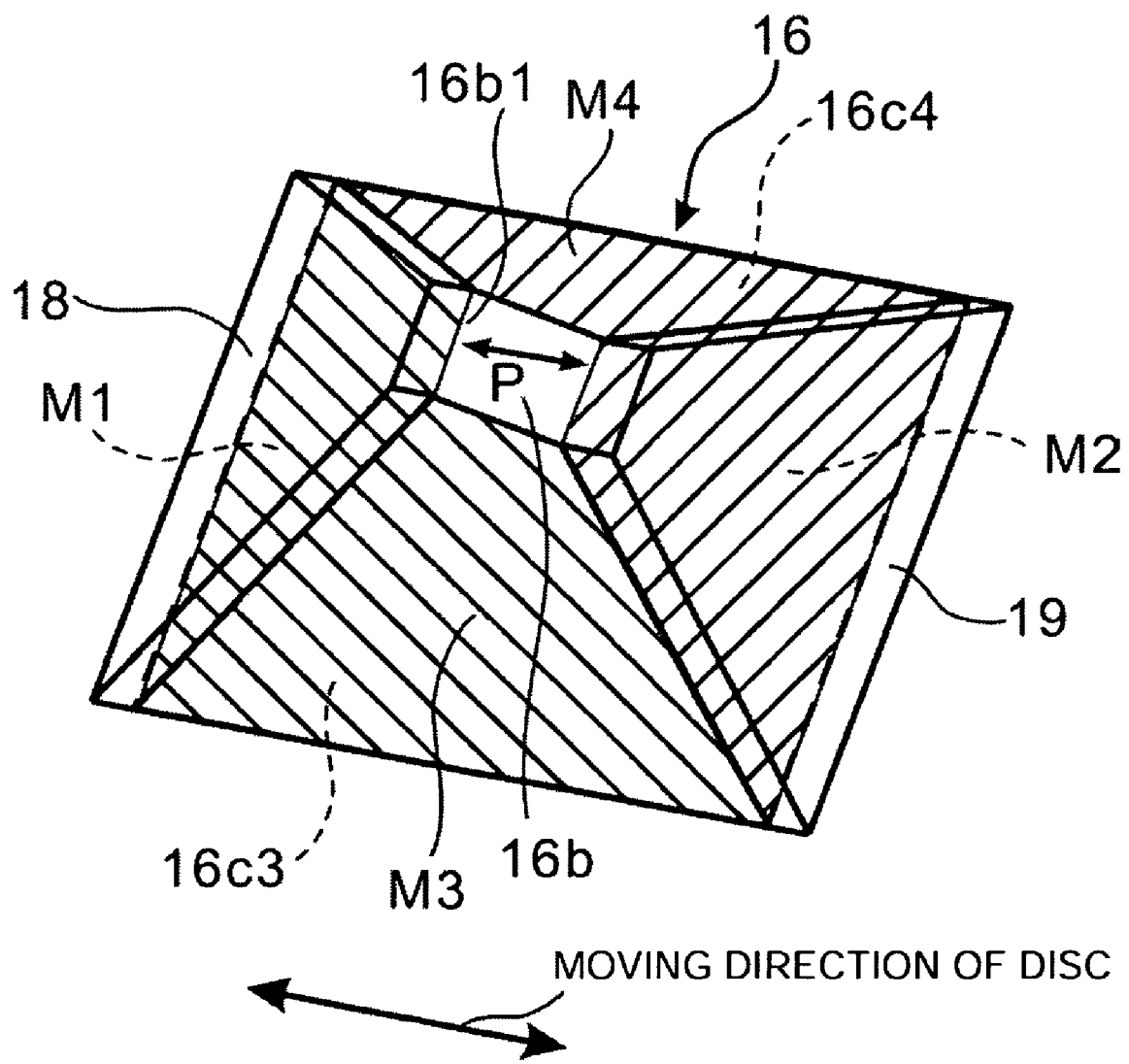
[FIG. 8] It is an enlarged perspective view of a core of the near field optical head in accordance with the invention, shown from an inclined plane side and showing a second embodiment of the invention.

Now, described will be the near field optical head in accordance with a second embodiment of the invention, made reference to FIGS. 8 and 9. In the second embodiment, components same as those in the first embodiment are marked with the same signs and references to be omitted from description.

FIG. 8 illustrates an example of a structure of the core 16, the structure being similar to that in FIG. 4, in which metal films (M1, M2, M3 and M4) are further formed on the inclined surfaces (16c1, 16c2, 16c3 and 16c4) of the core 16 and the main magnetic pole 18 and the auxiliary magnetic pole 19 are formed on the metal films M1 and M2.

The metal film has a function as a light shielding film for preventing the introduced light flux L from being leaked to the outside of the core 16 and is formed so as to achieve a surface plasmon effect of metal. This allows the light flux L to be converged more, so that the near field light N1 can be generated efficiently. Further, the plasmon effect allows the near field light N1 further increased in intensity, localized and having high energy to be generated.

A metal material such as Al and Au is effectively used as a material of the metal film. A film forming method such as vacuum evaporation and spattering is used to form the metal films (M1, M2, M3 and M4) all over the core 16 after forming the core 16 shown in FIG. 5. The metal on the end surface 16b of the core 16 is then only removed by means of an FIB (a focused ion beam) or by polishing, pushing with a weight and the like. This allows the metal films (M1, M2, M3 and M4) to be formed. Moreover, using a metal film forming method having directivity such as vacuum evaporation, which is shown in Steps S5 and S8 in FIGS. 6 and 7, also enables the metal films (M1, M2, M3 and M4) to be formed on the inclines surfaces of the core 16.

Figure 9A:
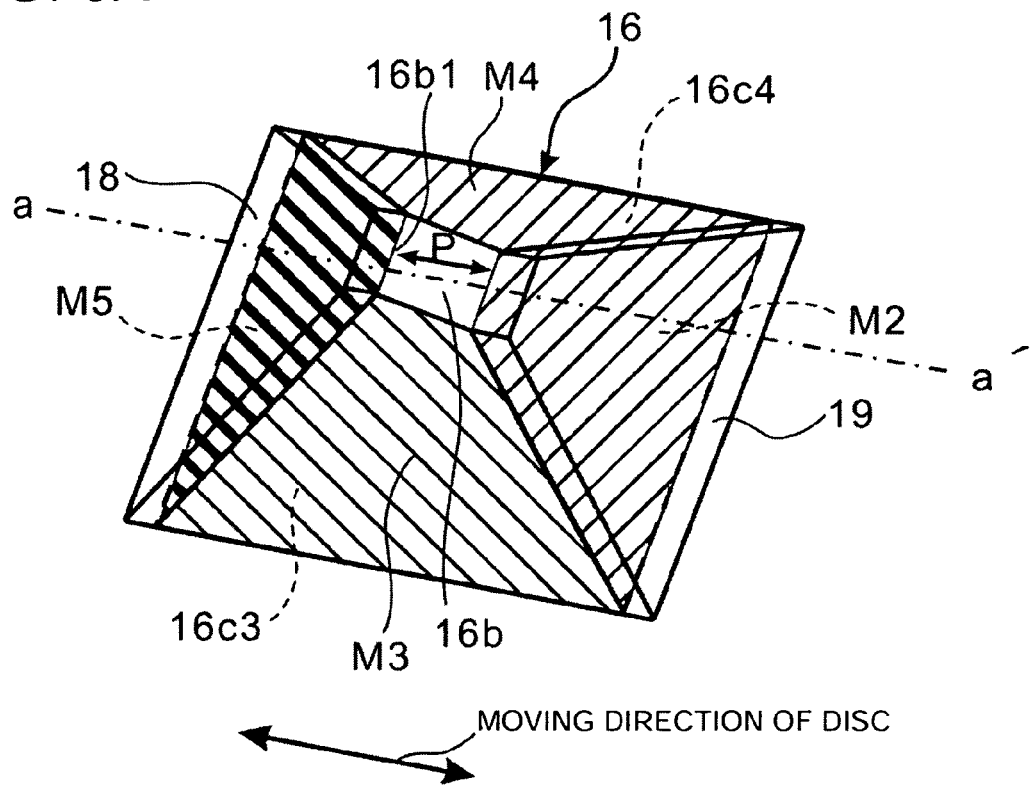
[FIG. 9] They are an enlarged perspective view and an enlarged sectional view of a core of the near field optical head in accordance with the invention, shown from an inclined plane side and showing a second embodiment of the invention.

Using the metal film forming method having directivity such as vacuum evaporation also allows the metal film M5 formed from a different material and the metal films M2, M3 and M4 to be formed on the inclined surface 16c1 and the inclined surfaces 16c2, 16c3 and 16c4, as shown in FIG. 9(a). For the metal film M5, used can be Au while Al is used for the metal films M2, M3 and M4, for example.

Figure 9B:
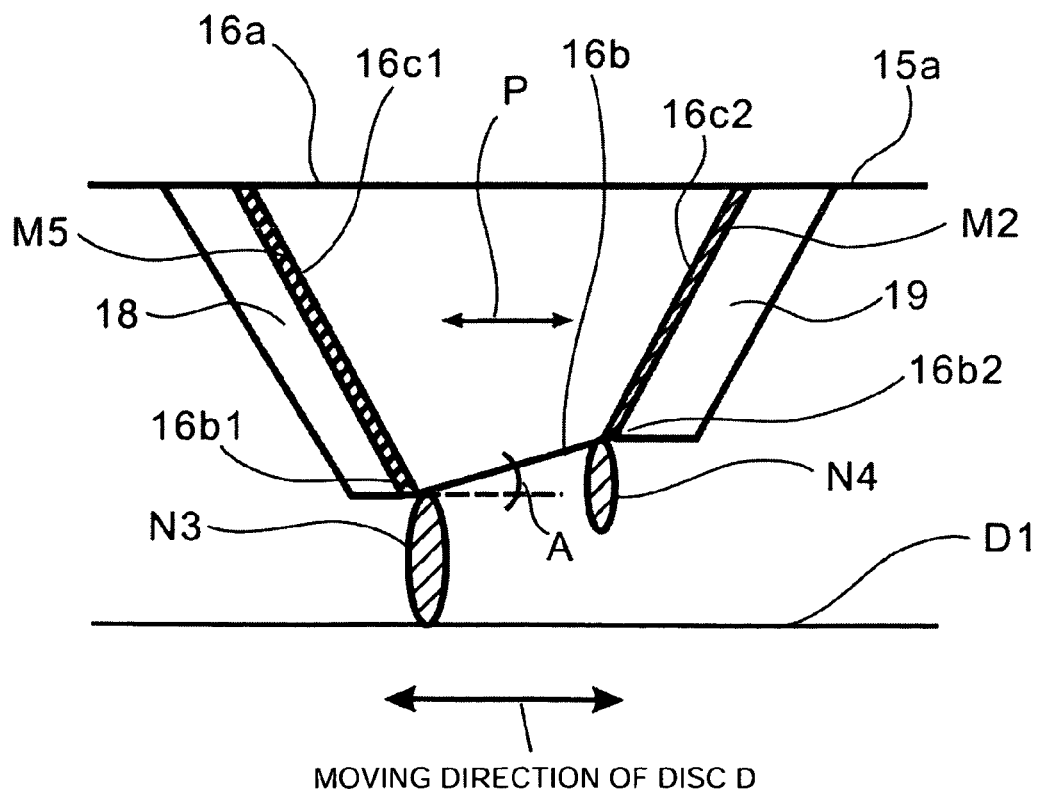

This allows only near field light N3 generated in the vicinity of the outline 16b1 closest to the disc surface D1 to operate on the disc surface D1 with the intensity higher than that of near field light N4, as shown in FIG. 9(b), when the light flux L having a direction of polarization P is introduced since the end surface 16b is inclined at the predetermined angle A with the disc surface D1.

According to the above, a background light influence of the near field light N4 upon the disc D can be prevented while using the near field light N3 in which high intensity and high resolution are achieved enables thermally assistance for the disc surface D1. This allows reliability in writing to be improved.

Third Embodiment

Now, described will be the near field optical head in accordance with a third embodiment of the invention, made reference with FIGS. 10 and 11. In the third embodiment, components same as those in the first and second embodiments are marked with the same signs and references to be omitted from description.

FIG. 10 illustrates an example of a structure of a core 36 wherein a bottom surface 36a and an end surface 36b are trapezoid and side surfaces 36c1, 36c2, 36c3 and 36c4 are provided. The end surface 36b is inclined at a predetermined angle with the bottom surface 36a.

Introduction of the light flux L having the direction of polarization P vertical to an outline 36b1 of the end surface 36b into the core 36 causes the near field lights N1 and N2 to be generated in the vicinity of an outline 36b1 and an outline 36b2. At that time, only the near field light N1 in the vicinity of the outline 36b1 of the core 36, which is closest to the disc surface D1, operates on the disc surface D1.

In accordance with the effect of the structure of the core 36, a minute area of the disc surface D1 on which the recording magnetic field generated from the main magnetic pole 18 operates can be only heated similarly to the effect of the core 16 in FIG. 4, so that thermal assistance in recording of the magnetic field can be performed with high resolution and high precision.

Furthermore, forming a magnetic pole structure of the core 36 so that a top surface 19a of the auxiliary magnetic pole 19 would have an area larger than a top surface 18a of the main magnetic pole 18 causes the recording magnetic field generated from the main magnetic pole 18 to record information in a recording layer D3 of the disc D, and then, change into a dispersed magnetic filed having lower intensity to be returned to the auxiliary magnetic pole 19. This allows an efficient magnetic record with high precision to be achieved.

The core 36 can be formed only by changing the etching mask 101 in the method of forming the core 16 shown in FIGS. 5 to 7 into the shape of a trapezoid.

Moreover, forming the metal films (M1 or M5, M2, M3 and M4) on the side surfaces (36c1, 36c2, 36c3 and 36c4) of the core 36, as shown in FIGS. 8 and 9, allows the near field light N1 having high intensity to be generated, similarly to the effect of the core 16.

Figure 11A:
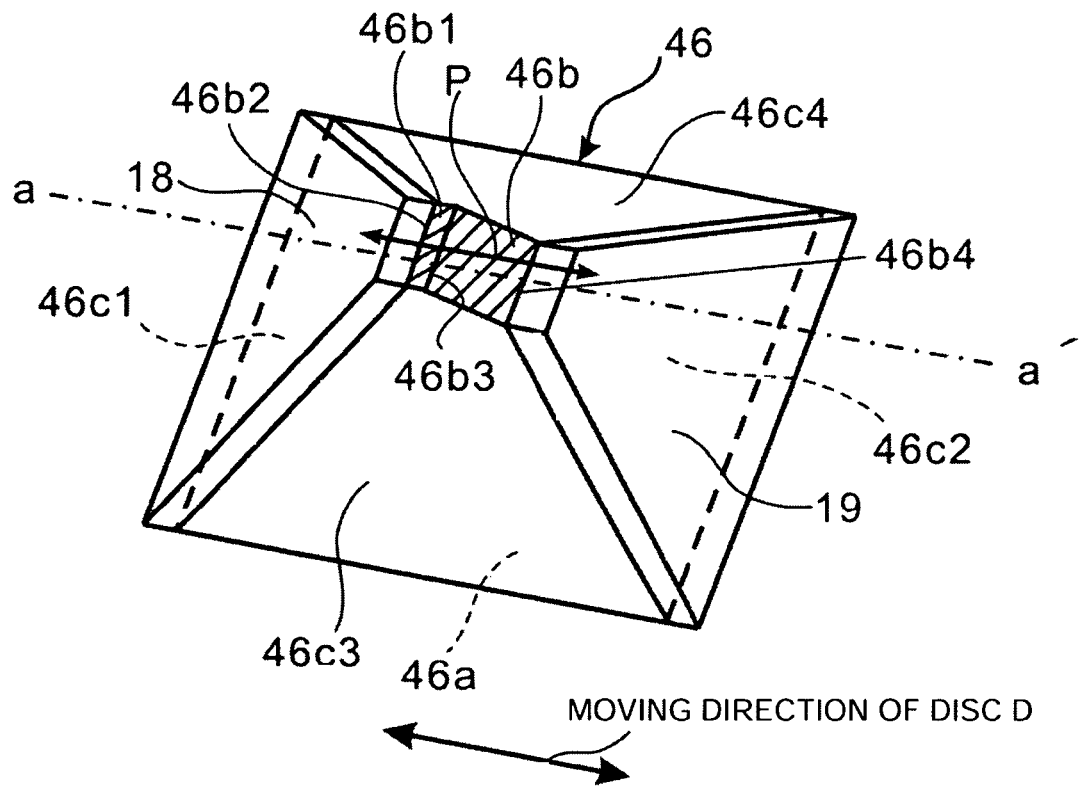
[FIG. 11] They are an enlarged perspective view and an enlarged sectional view of a core of the near field optical head in accordance with the invention, shown from an inclined plane side and showing a third embodiment of the invention.
Figure 11B:
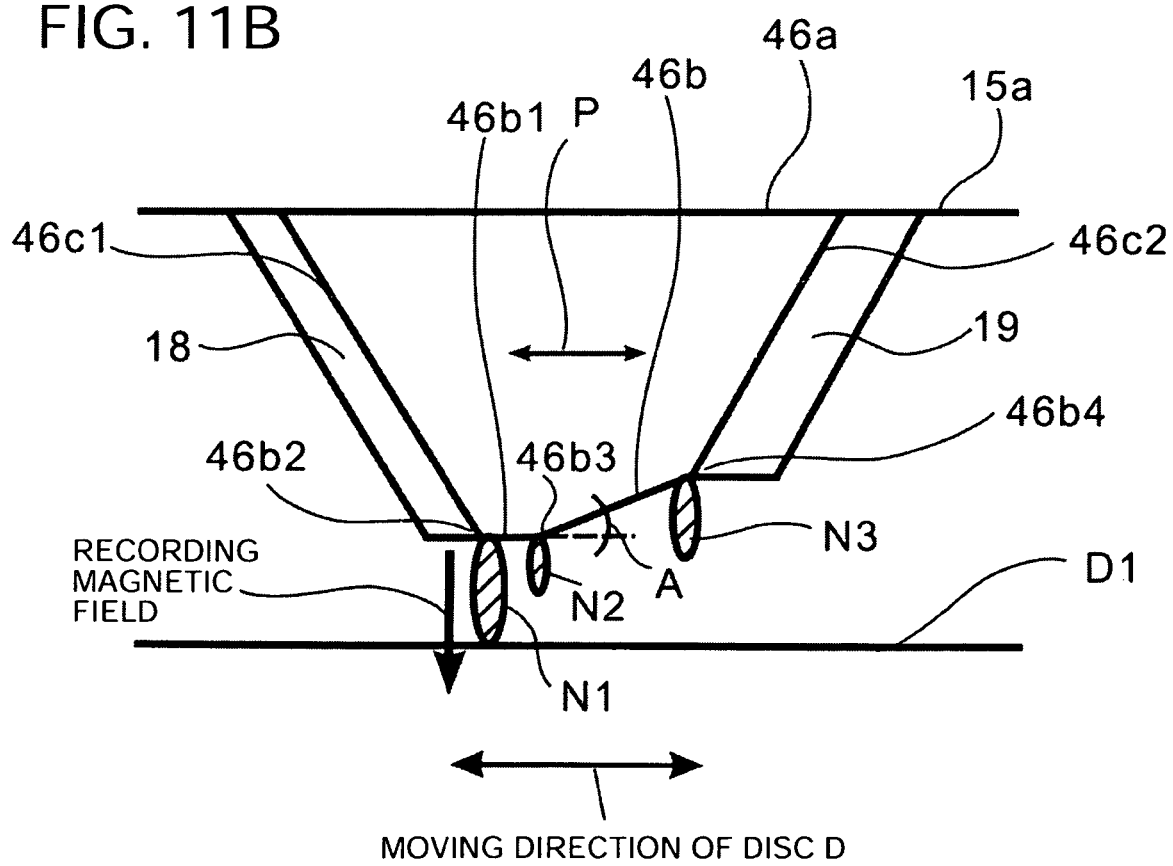

FIG. 11(a) illustrates a structure of a core 46. FIG. 11(b) is a sectional view taken along a-a' in FIG. 11(a).

The core 46 shown in FIG. 11(a) has a structure in which a part of the end surface 16b of the core 16 shown in FIG. 4 in the vicinity of the outline 16b1 is parallel to the bottom surface 16a. An end surface of the core 46 includes an end surface 46b inclined at the predetermined angle A with a bottom surface 46a and an end surface 46b1 parallel to the bottom surface 46a.

In the structure of the core 46, introduction of the light flux L having the direction of polarization P, which is parallel to the bottom surface 46a and vertical to an outline 46b2 of the end surface 46b, into the core 46 causes the near field lights N1, N2 and N3 to be generated in the vicinity of outlines 46b2, 46b3 and 46b4, as shown in FIG. 11(b). In this case, the near field lights N1 and N2 are generated in the vicinity of the outlines 46b2 and 46b3 of the end surface 46b1 of the core 46, the outlines 46b2 and 46b3 being closest to the disc surface D1. The intensity of the near field light N2, however, is weaker than that of the near field light N1. Accordingly, almost only the near field light N1 operates on the disc surface D1.

In accordance with the effect of the structure of the core 36, a minute area of the disc surface D1 on which the recording magnetic field generated from the main magnetic pole 18 operates can be only heated similarly to the effect of the core 16 in FIG. 4, so that thermal assistance in recording of the magnetic field can be performed with high resolution and high precision.

The core 46 can be formed by scraping the vicinity of the outline 16b1 of the core 16 and the top surface of the main magnetic pole 18 by polishing or by means of an FIB (a focused ion beam) in the last step informing the core 16 shown in FIGS. 5 to 7. It is also possible to scrap the vicinity of the outline 16b1 by polishing or by means of an FIB (focused ion beam) after carrying out Step S6 in forming the core 16. The end surface 46b1 can be also formed by a method of stopping etching at a stage precedent to forming of the outline 16b1 after progress of side etching in a stage of performing Step S5 for forming the core 16.

Further, forming the metal films (M1 or M5, M2, M3 and M4) on the side surfaces (46c1, 46c2, 46c3 and 46c4) of the core 46, as shown in FIGS. 8 and 9 allows the near field light N1 having high intensity to be generated, similarly to the effect of the core 16.

Furthermore, forming a magnetic pole structure of the core 46 so that a top surface 19a of the auxiliary magnetic pole 19 would have an area larger than a top surface 18a of the main magnetic pole 18 causes the recording magnetic field generated from the main magnetic pole 18 to record information in a recording layer D3 of the disc D, and then, change into a dispersed magnetic filed having lower intensity to be returned to the auxiliary magnetic pole 19. This allows an efficient magnetic record with high precision to be achieved.

Fourth Embodiment

Now, described will be the near field optical head in accordance with a fourth embodiment of the invention, made reference to FIG. 12. In the fourth embodiment, components same as those in the first, second and third embodiments are marked with the same signs and references to be omitted from description.

A structure of a core 56 shown in FIG. 12 is an example of a cylindrical structure having a circular bottom surface 56a and an end surface 56b and a side surface 56c. The end surface 56b is inclined at the predetermined angle A with a surface 56' parallel to the bottom surface 56a.

Introduction of the light flux L having the direction of polarization P substantially vertical to a tangent T at a point 56b1 in an outline of the end surface 56b into the core 56 causes the localized near field lights N1 and N2 to be generated in the vicinity of points 56b1 and 56b2 in the outline. At that time, in the core 56, the near field light N1 in the vicinity of the point 56b1 in the outline, the point 56b1 being closest to the disc surface D1, only operates on the disc surface D1.

The near field light generated in the outline in the case of the structure having polygonal end surface like the core 16 in FIG. 4 is generated along a longitudinal direction of the outline. Accordingly, the generated near field light has a somewhat long and narrow shape. In the structure of circular end surface like the core 56, however, generated in the vicinity of the points 56b1 and 56b2 in the outline is further localized spot-shaped near field lights N1 and N2.

As a result, in the structure of the core 56, a minute area of the disc surface D1 on which the recording magnetic field generated from the main magnetic pole 18 operates can be heated in addition to the effect of the core 16 in FIG. 4, so that thermal assistance in recording of the magnetic field can be performed with high resolution and high precision.

Furthermore, forming a magnetic pole structure of the core 56 so that a top surface 19a of the auxiliary magnetic pole 19 would have an area larger than a top surface 18a of the main magnetic pole 18 causes the recording magnetic field generated from the main magnetic pole 18 to record information in a recording layer D3 of the disc D, and then, change into a dispersed magnetic filed having lower intensity to be returned to the auxiliary magnetic pole 19. This allows an efficient magnetic record with high precision to be achieved.

The core 56 can be formed only by changing the etching mask 101 in the method of forming the core 16 shown in FIGS. 5 to 7 into the shape of a circle.

Moreover, forming the metal films (M1 or M5, M2, M3 and M4) on the side surface 56c of the core 56, as shown in FIGS. 8 and 9, allows the near field light N1 having high intensity to be generated, similarly to the effect of the core 16.

In addition, forming a top surface 19a of the auxiliary magnetic pole 19 so as to have an area larger than a top surface 18a of the main magnetic pole 18 in the structure of the core 56 causes the recording magnetic field generated from the main magnetic pole 18 to record information in a recording layer D3 of the disc D, and then, change into a dispersed magnetic filed having lower intensity to be returned to the auxiliary magnetic pole 19. This allows an efficient magnetic record with high precision to be achieved.

Fifth Embodiment

Figure 13:
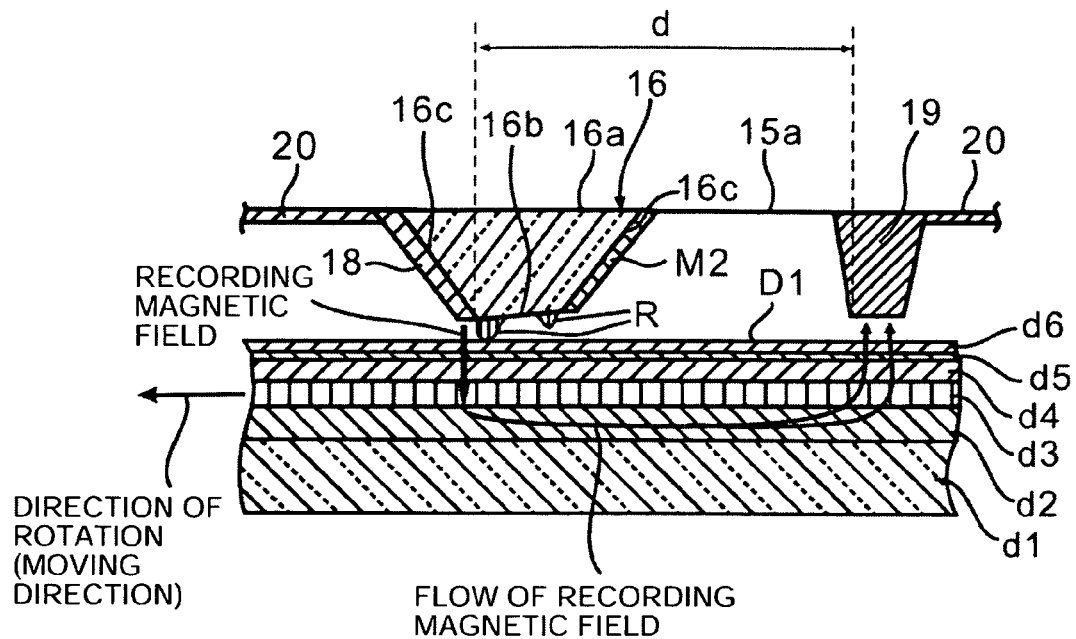
[FIG. 13] It is an enlarged sectional view of a core of the near field optical head shown in FIG. 2(a) and its periphery.

Now, described will be the near field optical head in accordance with a fifth embodiment of the invention, made reference to FIG. 13. In the fifth embodiment, components same as those in the first, second, third and fourth embodiments are marked with the same signs and references to be omitted from description.

FIG. 13 is an enlarged view of the core 16 shown in FIG. 2(a) and its periphery in accordance with the second embodiment. A structure of the near field optical head 2 shown in FIG. 13 is similar to that of the near field optical head 2 shown in FIG. 2(b) in accordance with the first embodiment. The structure of the near field optical head 2 shown in FIG. 13, however, is different in that the auxiliary magnetic pole 19 formed in the core 16 in FIG. 2(b) is formed on the facing surface 15a in FIG. 13.

Figure 14:
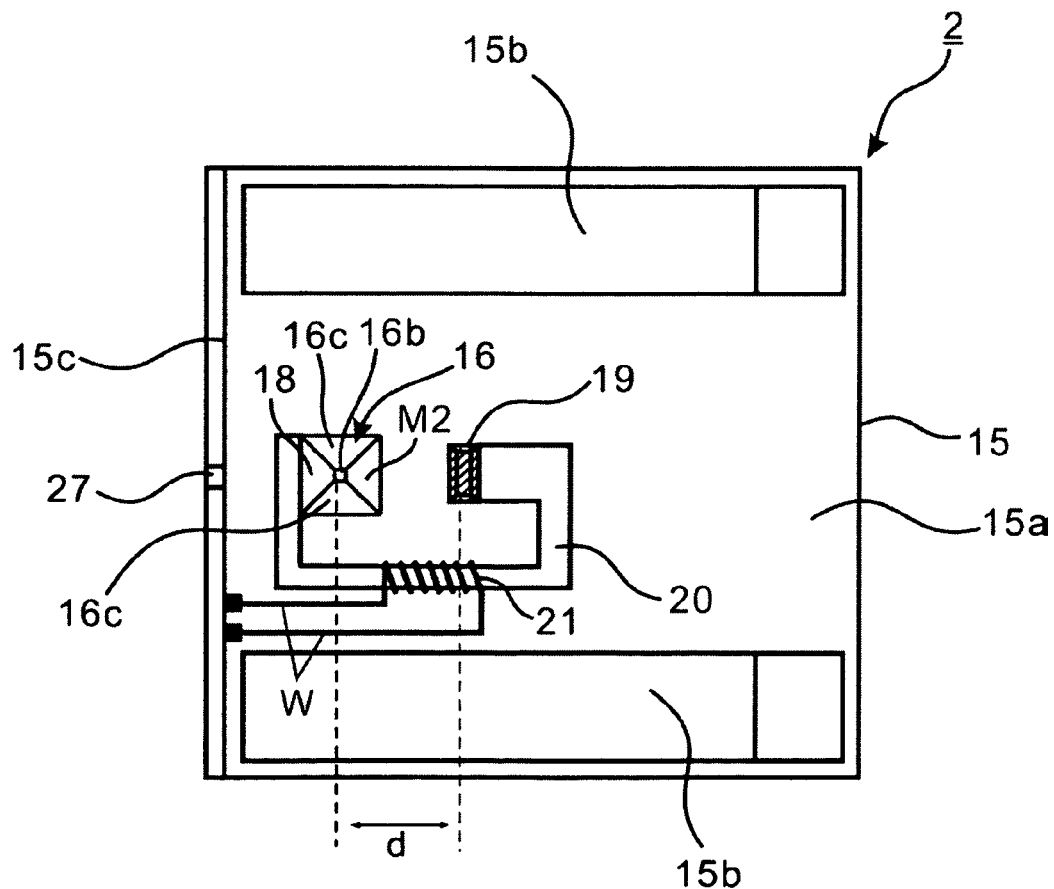
[FIG. 14] It illustrates the near field optical head shown in FIG. 13 in a view from a disc surface side.

FIG. 14 illustrates a structure of the facing surface 15a of the near field optical head 2 in accordance with the second embodiment.

A difference from the structure of the near field optical head 2 in accordance with the first embodiment in FIG. 3 is in that the main magnetic pole 18 is only formed on the inclined surface of the core 16 while the auxiliary magnetic pole 19 is formed on the facing surface 15a. The main magnetic pole 18 is connected to the auxiliary magnetic pole 19 by means of the magnetic circuit 20.

The coil 21 wound around the magnetic circuit 20 on the facing surface 15a is connected to the wiring W supplied with an electric current modulated in accordance with information from the control part 8. An electric flow to the coil 21 causes a magnetic field in the magnetic circuit 20. Accordingly, the recording magnetic field flows from the main magnetic pole 18 to the auxiliary magnetic pole 19 to perform recording of information as shown in FIG. 13.

The core 16 and the main magnetic pole 18 shown in FIGS. 13 and 14 may be manufactured by a method same as the method shown in FIGS. 5 and 6. The auxiliary magnetic pole 19 may be formed on the facing surface 15a separately after forming the core 16 and the main magnetic pole 18. The auxiliary magnetic pole 19 may be also formed at the same time as the main magnetic pole 18 by adding a pattern of the auxiliary magnetic pole 19 to the photo mask used in forming the main magnetic pole 18. Further, the auxiliary magnetic pole 19 may be formed in a projection simultaneously with forming the main magnetic pole 18 on the core 16 after forming the projection in which the auxiliary magnetic pole 19 is formed in the photo mask used in forming the core 16 on the facing surface 15a simultaneously with forming the core 16. Moreover, the auxiliary magnetic pole 19 may be formed in the projection at the same time as forming the main magnetic pole 18 on the core 16.

In the near field optical head 2 in accordance with the second embodiment, the area irradiated with the near field light on the disc D and the area irradiated with the recording magnetic field from the magnetic pole on the disc D, the areas being shown in the first embodiment in FIG. 2(b), can be accorded much more. This allows the near field light and the magnetic field to be prevented from spreading, and thus, reliability in writing to be improved. In addition, the main magnetic pole 18 is separated from the auxiliary magnetic pole 19 by a predetermined distance on the facing surface 15a. Accordingly, the recording magnetic field generated from the main magnetic pole 18 records information in a recording layer D3 of the disc D, and then, changes into a dispersed magnetic filed having lower intensity to be returned to the auxiliary magnetic pole 19, so that an effect of reducing an influence of reversing another recorded magnetic field can be achieved. This allows an efficient magnetic record with high precision to be carried out.

Furthermore, the magnetic record is possible when the distance d between the main magnetic pole 18 and the auxiliary magnetic pole 19, which is shown in FIGS. 13 and 14, is from several hundreds nanometers to several tens micrometers. Especially in the case that the distance d is several micrometers, magnetic record can be performed most efficiently.

Moreover, the core 16 of the near field optical head 2 in accordance with the second embodiment can be formed into the same structure as that of the cores 16, 36, 46 and 56 shown in FIGS. 4, 8, 9, 10 and 11. Accordingly, characteristics in structure and function of the near field optical head shown in FIGS. 4, 8, 9, 10 and 11 can be made same. This allows an efficient magnetic record with high precision to be achieved.

In the respective embodiments, description has been made on the assumption that the magnetic circuit 20 is provided in the facing surface 15a. It goes without saying that the invention is not limited to the above. The magnetic circuit 20 may be provided on the inclined surface of the core 16 or in a position other than the above.

INDUSTRIAL APPLICABILITY

In accordance with the invention, miniaturization can be achieved while the near field light having high resolution can be generated.

The invention claimed is:

1. A near field optical head for generating near field light from an introduced light flux to heat a magnetic recording medium rotating in a fixed direction and for causing magnetization reversal by giving the magnetic recording medium a recording magnetic field to record information, the near field optical head characterized by comprising:

a slider provided so as to float from a surface of the magnetic recording medium by a predetermined distance, the slider having a facing surface faced to a surface of the magnetic recording medium;

a tipped-shaped near field light generating element formed on the facing surface to have a bottom surface in contact with the facing surface, a top surface formed into a flat surface by cutting a top end of a cone or a pyramid, the flat surface being at a predetermined angle with the bottom surface, and a side surface connecting the bottom surface with the top surface for generating near field light from each of a longest distance outline part of an outline of the top surface, the longest distance outline part having a longest distance between the facing surface and the outline of the top surface, and another outline part of the outline of the top surface, the another outline part being a part other than the longest distance outline part;

a magnetic pole part formed from a main magnetic pole formed on the side surface and an auxiliary magnetic pole facing the main magnetic pole;

a thin film-shaped magnetic circuit connected to the magnetic pole part; and a coil wound around the magnetic circuit.

2. The near field optical head according to claim 1, characterized in that the light flux includes polarized light substantially vertical to a tangent at least at a point of the longest distance outline part.

3. The near field optical head according to claim 1, characterized in that a metal film is provided on at least a part of the side surface of the tip.

4. The near field optical head according to claim 3, characterized in that a metal film is provided on at least the side surface on a side in contact with the longest distance outline part.

5. The near field optical head according to claim 4, characterized in that a first metal film is formed on the side surface on the side in contact with the longest distance outline part while a second metal film is formed on the side surface on a side in contact with the another outline part.

6. The near field optical head according to claim 5, characterized in that materials of the first metal film and the second metal film are different.

7. The near field optical head according to claim 5, characterized in that the main magnetic pole of the magnetic pole part is formed on the side surface on the side in contact with the longest distance outline part through the first metal film while the auxiliary magnetic pole of the magnetic pole part is formed on the side surface on the side in contact with the another outline part through the second metal film.

8. The near field optical head according to claim 2, characterized in that a part of the top surface including the longest distance outline part is parallel to the facing surface.

9. The near field optical head according to claim 1, characterized in that the facing surface has an element area provided with the near field light generating element and another area other than the element area, wherein the auxiliary magnetic pole is formed in the another area.

10. The near field optical head according to claim 1, characterized in that the auxiliary magnetic pole is formed on the side surface.

* * * * *